(12) United States Patent
Tafti

(10) Patent No.: US 12,491,016 B1
(45) Date of Patent: Dec. 9, 2025

(54) DEVICES FOR KYPHOPLASTY AND METHODS OF USE THEREOF

(71) Applicant: TRANSLATIONAL AND FUNDAMENTAL TECHNOLOGIES INSTITUTE LLC, Encino, CA (US)

(72) Inventor: Bashir Akhavan Tafti, Encino, CA (US)

(73) Assignee: TRANSLATIONAL AND FUNDAMENTAL TECHNOLOGIES INSTITUTE LLC, Encino, CA (US)

( * ) Notice: Subject to any disclaimer, the term of this patent is extended or adjusted under 35 U.S.C. 154(b) by 0 days.

(21) Appl. No.: 19/047,263

(22) Filed: Feb. 6, 2025

(51) Int. Cl.
| | | |
|---|---|---|
| *A61B 17/88* | (2006.01) | |
| *A61B 17/00* | (2006.01) | |
| *A61B 17/56* | (2006.01) | |
| *A61B 90/00* | (2016.01) | |

(52) U.S. Cl.
CPC . *A61B 17/8858* (2013.01); *A61B 2017/00115* (2013.01); *A61B 2017/00473* (2013.01); *A61B 2017/564* (2013.01); *A61B 2090/061* (2016.02); *A61B 2090/3966* (2016.02)

(58) Field of Classification Search
CPC ...... A61F 2002/30581–30583; A61F 2002/30579; A61B 17/885; A61B 17/8852; A61B 17/8855; A61B 17/8858
See application file for complete search history.

(56) References Cited

U.S. PATENT DOCUMENTS

| | | | | |
|---|---|---|---|---|
| 8,529,628 | B2* | 9/2013 | Marino | A61B 17/8858 623/17.11 |
| 2004/0098017 | A1* | 5/2004 | Saab | A61B 17/8855 606/192 |
| 2006/0106461 | A1* | 5/2006 | Embry | A61B 17/7097 623/17.12 |
| 2007/0043440 | A1* | 2/2007 | William | A61B 17/8858 623/17.11 |
| 2008/0140207 | A1* | 6/2008 | Olmos | A61F 2/4455 623/17.11 |
| 2008/0281364 | A1* | 11/2008 | Chirico | A61B 17/8819 606/86 A |
| 2009/0204216 | A1* | 8/2009 | Biedermann | A61F 2/44 623/17.12 |
| 2009/0299401 | A1* | 12/2009 | Tilson | A61M 25/1029 606/192 |
| 2010/0274180 | A1* | 10/2010 | Donovan | A61M 5/16854 703/2 |
| 2011/0106007 | A1* | 5/2011 | Auyoung | A61B 90/39 604/96.01 |
| 2013/0310877 | A1* | 11/2013 | Fuerderer | A61M 25/10 606/246 |
| 2014/0135780 | A1* | 5/2014 | Lee | A61F 2/4611 606/93 |

* cited by examiner

*Primary Examiner* — Eduardo C Robert
*Assistant Examiner* — Michelle C Green
(74) *Attorney, Agent, or Firm* — Clark & Elbing LLP

(57) ABSTRACT

The present disclosure features devices and kits for performing a kyphoplasty and methods of use thereof.

30 Claims, 10 Drawing Sheets

DEVICES FOR KYPHOPLASTY AND METHODS OF USE THEREOF

BACKGROUND OF THE INVENTION

Kyphoplasty is a minimally invasive procedure for treatment of vertebral compression fractures, often caused by conditions like osteoporosis or metastatic lesions. During the procedure, a small incision is made in the back and the vertebral body is accessed using a coaxial access system comprising an inner stylet or trocar and an outer cannula (e.g., an access trocar). The trocar (e.g., the inner access needle) is then removed but the cannula (i.e., the outer hollow tube that allows access to the posterior aspect of the vertebral body) remains in place to allow for advancement of other instruments. A drill is then advanced into the fractured vertebral body to create a track. Subsequently, a balloon is inserted through the track into the fractured vertebral body through the cannula. The balloon is then inflated to restore vertebral height and create a cavity. Once this is achieved, the balloon is removed, and the cavity is filled with a special bone cement through the cannula to stabilize the bone.

While kyphoplasty can significantly alleviate pain and improve mobility, there are potential complications associated with the procedure. One of the most common complications of kyphoplasty is cement leakage into the spinal canal and neural foramina, vertebral veins, or surrounding soft tissues. Cement leakage can happen due to excessive pressure or volume during cement injection, extensive fracture lines and poor bone quality, or improper placement of the cement injection cannula. Cement leakage can result in nerve damage, spinal cord compression, increased pain, and pulmonary embolism if the cement enters the bloodstream. Another potential complication is minimal or sub-optimal height restoration which can happen when there is significant loss of structural integrity, making it difficult to fully restore height, even with balloon expansion. Additionally, the quality of the bone, particularly in patients with osteoporotic fractures, may limit the ability of the vertebra to retain its shape after the balloon is deflated. Lastly, complications like cement leakage or the formation of fissures in the vertebra can also disrupt the restoration process, leaving the vertebra with suboptimal height recovery.

Therefore, there is a need for kyphoplasty devices and systems that enhance safety by reducing the risk for complications and facilitate more reliable height restoration.

SUMMARY OF THE DISCLOSURE

The present disclosure features a devices, methods, and kits for performing a kyphoplasty procedure. During the procedure, the implant of the device is inserted into a damaged, compromised, or collapsed vertebra and expanded to create a space. The implant is then filled with a bone fortifying material (e.g., a bone cement), which subsequently hardens, thereby providing support to the collapsed, compromised, or damaged vertebra.

In a first aspect, the device for performing a kyphoplasty procedure includes: (a) an implant that is sized for placement in a vertebral space within a vertebra of a subject, wherein the implant includes a proximal end, a distal end, a body including a plurality of struts extending between the proximal end and the distal end, and a flexible membrane in contact with the plurality of struts; wherein the implant is configured to transition from a first state including a first height, a first width, and a first length, to a second state including a second height, a second width, and a second length; and wherein the implant is malleable; (b) a shaft including a proximal end and a distal end, wherein the distal end of the shaft is reversibly coupled to the proximal end of the implant; (c) an actuator coupled to the implant via the shaft, where the actuator is configured to transition the implant from the first state to the second state upon activation; and (d) an indicator (e.g., read-out) for identifying a property of the implant in the second state (e.g., the second length, second width, second height, and/or implant volume).

In some embodiments, the property is a height (e.g., a second height) or a volume (e.g., an implant volume). In some embodiments, the indicator is a display (e.g., a mechanical display (e.g., a rotary disk) or a digital display). In some embodiments, the indicator is configured to ensure accurate delivery of the bone fortifying material into the implant, minimizing the risk of overfilling or underfilling the implant.

In some embodiments, the actuator is configured to transition the implant from the first state to the second state by transmitting mechanical force to the proximal end of the implant to move the proximal end of the implant toward the distal end of implant. In some embodiments, the transition of the implant from the first state to the second state is reversible. In some embodiments, the actuator is configured to transition the implant from the second state to the first state or a third state, wherein the third state includes a third height, a third width, and a third length.

In some embodiments, the implant includes: (i) a lumen at the proximal end, and the shaft includes a lumen spanning the length of the shaft, wherein the lumen of the shaft and the lumen of the implant are in fluid communication; and/or (ii) a rod extending from the proximal end to the distal end of the implant, wherein the rod includes a lumen and a plurality of openings (e.g., holes, slits, grooves, or access channels), and wherein the lumen of the shaft and the lumen of the rod are in fluid communication. In some embodiments, the device further includes an inlet port that is fluidly connected to the lumen of the shaft, whereby the inlet port is configured to receive a volume of a solid phase, a semi-solid phase, or a liquid phase bone fortifying material (e.g., a bone cement, such as, e.g., polymethylmethacrylate (PMMA)) for delivery to the implant. In some embodiments, the device further includes a handle, wherein the proximal end of the shaft is in contact with the handle, wherein the handle includes the inlet port, and optionally wherein the actuator is located on the handle.

In some embodiments, the flexible membrane includes a continuous flexible material that partially covers the body of the implant on an interior or exterior of the plurality of struts, wherein the flexible membrane is configured to allow fluidic output at a superior side and/or an inferior side of the vertebral space (e.g., to fill in fracture lines) while inhibiting or reducing fluidic output at an anterior side and/or posterior side of the vertebral space (e.g., toward the spinal canal and the vessels). In some embodiments, the flexible membrane includes a continuous flexible material that fully covers the body of the implant on an interior or exterior of the plurality of struts, wherein the flexible membrane is configured to fluidically seal the implant. In some embodiments, the flexible membrane includes a biocompatible material, optionally wherein the flexible membrane includes polytetrafluoroethylene, polyester fiber, or Dacron. In some embodiments, the flexible membrane is configured to contain and shape an internal volume of the implant (e.g., implant volume), allowing for controlled adjustment and precise delivery of the bone fortifying material (e.g., a bone cement) within the implant volume.

In some embodiments, the plurality of struts: (i) form a plurality of lattice cells, wherein the plurality of lattice cells have a polygonal, square, rectangular, triangular, diamond, circular, elliptical, oval, oblong, lens, asteroid, deltoid, slit, or amorphous shape; or (ii) converge at both the proximal end and the distal end of the implant and are spaced apart therebetween, and wherein each of the plurality of struts has one or more curve. In some embodiments, the plurality of struts are deformable (or malleable) and include nitinol, stainless steel, or platinum. In some embodiments, the implant is shaped as a sphere, ovoid, dimpled ovoid, or cylinder in the first state and/or the second state. In some embodiments, the implant further includes a radiopaque marker. In some embodiments, the radiopaque marker is included along the entire length of the implant or a portion thereof. In some embodiments, the radiopaque marker may be included at the proximal end of the implant, the distal end of the implant, or both.

In some embodiments, the implant in the first state has: (i) a length of from about 1 cm to about 10 cm (e.g., from about 2 cm to about 10 cm, from about 6 cm to about 10 cm, from about 1 cm to about 3 cm, from about 3 cm to about 5 cm, from about 5 cm to about 7 cm, from about 8 cm to about 10 cm, from about 1 cm to about 5 cm, from about 5 cm to about 10 cm, e.g., about 1 cm, about 2 cm, about 3 cm, about 4 cm, about 5 cm, about 6 cm, about 7 cm, about 8 cm, about 9 cm, or about 10 cm); (ii) a width of from about 0.5 cm to about 5 cm (e.g., from about 0.5 cm to about 2.5 cm, from about 0.5 cm to about 4 cm, from about 1 cm to about 5 cm, from about 1 cm to about 2 cm, from about 2 cm to about 4 cm, from about 3 cm to about 5 cm, from about 4 cm to about 5 cm, e.g., about 0.5 cm, about 1 cm, about 1.5 cm, about 2 cm, about 2.5 cm, about 3 cm, about 3.5 cm, about 4 cm, about 4.5 cm, or about 5 cm); and (iii) a height of from about 0.2 cm to about 1 cm (e.g., from about 0.2 cm to about 0.8 cm, from about 0.3 cm to about 0.5 cm, from about 0.4 cm to about 0.6 cm, from about 0.5 cm to about 0.7 cm, from about 0.5 cm to about 1 cm, from about 0.6 cm to about 0.8 cm, from about 0.7 cm to about 0.9 cm, e.g., about 0.2 cm, about 0.3 cm, about 0.4 cm, about 0.5 cm, about 0.6 m, about 0.7 cm, about 0.8 cm, about 0.9 cm, or about 1 cm); and wherein the implant in the second state has: (iv) a length of from about 0.5 cm to about 5 cm (e.g., from about 0.5 cm to about 2.5 cm, from about 0.5 cm to about 4 cm, from about 1 cm to about 5 cm, from about 1 cm to about 2 cm, from about 2 cm to about 4 cm, from about 3 cm to about 5 cm, from about 4 cm to about 5 cm, e.g., about 0.5 cm, about 1 cm, about 1.5 cm, about 2 cm, about 2.5 cm, about 3 cm, about 3.5 cm, about 4 cm, about 4.5 cm, or about 5 cm); (v) a width of from about 1 cm to about 10 cm (e.g., from about 2 cm to about 10 cm, from about 6 cm to about 10 cm, from about 1 cm to about 3 cm, from about 3 cm to about 5 cm, from about 5 cm to about 7 cm, from about 8 cm to about 10 cm, from about 1 cm to about 5 cm, from about 5 cm to about 10 cm, e.g., about 1 cm, about 2 cm, about 3 cm, about 4 cm, about 5 cm, about 6 cm, about 7 cm, about 8 cm, about 9 cm, or about 10 cm); and (vi) a height of from about 0.3 cm to about 5 cm (e.g., from about 0.3 cm to about 0.5 cm, from about 0.5 cm to about 1 cm, from about 1 cm to about 5 cm, from about 1 cm to about 2 cm, from about 2 cm to about 4 cm, from about 3 cm to about 5 cm, from about 4 cm to about 5 cm, e.g., about 0.3 cm, about 0.4 cm, about 0.5 cm, about 0.6 cm, about 0.7 cm, about 0.8 cm, about 0.9 cm, about 1 cm, about 1.5 cm, about 2 cm, about 2.5 cm, about 3 cm, about 3.5 cm, about 4 cm, about 4.5 cm, or about 5 cm). In some embodiments, the implant in the first state and/or second state has a volume of 0.15 mL to about 25 mL (e.g., from about 0.15 mL to about 0.25 mL, from about 0.25 mL to about 0.5 mL, from about 0.5 mL to about 1.0 mL, from about 1 mL to about 5 mL, from about 1 mL to about 10 mL, from about 5 mL to about 10 mL, from about 5 mL to about 15 mL, from about 5 mL to about 25 mL, from about 10 mL to about 20 mL, from about 15 mL to about 20 mL, from about 15 mL to about 25 mL, e.g., about 0.15 mL, about 0.5 mL, about 1 mL, about 2 mL, about 3 mL, about 4 mL, about 5 mL, about 6 mL, about 7 mL, about 8 mL, about 9 mL, about 10 mL, about 11 mL, about 12 mL, about 13 mL, about 14 mL, about 15 mL, about 16 mL, about 17 mL, about 18 mL, about 19 mL, about 20 mL, about 21 mL, about 22 mL, about 23 mL, about 24 mL, or about 25 mL).

In some embodiments, the device further includes: (i) a loop, a fastener, a hook, a screw connection, or a magnet that attaches the shaft to the implant; and/or (ii) a release mechanism operatively coupled to the shaft, whereby operation of the release mechanism is configured to detach the shaft from the implant, optionally wherein the release mechanism is configured as a lever, a rotating disk, a push-button, a screw connection, or a slide block.

In a second aspect, the disclosure features a method of performing a kyphoplasty procedure, including: (a) inserting the implant of the device of the first aspect into a vertebral space of a vertebra of a subject; (b) transitioning the implant from the first state to the second state by activating actuator, wherein the indicator of the device indicates a value for the second height and an implant volume; (c) injecting a volume of a bone fortifying material (e.g., a bone cement, such as, e.g., polymethylmethacrylate (PMMA)) corresponding to the value of the implant volume, a greater value, or a lesser value into the implant via the lumen of the shaft; and (d) detaching the shaft of the device from the implant.

In some embodiments, prior to step (a), the method further includes creating the vertebral space in the vertebra with a bone drill. In some embodiments, activating the actuator in step (b) further includes transmitting mechanical force to the proximal end of the implant to move the proximal end of the implant toward the distal end of implant.

In some embodiments, the method further includes, before step (c), reattaching the implant and the shaft, and, optionally, repositioning the implant in the vertebral space. In some embodiments, the implant includes a radiopaque marker, and repositioning the implant further includes using an imaging technique to visualize the position of the implant in the vertebral body by way of the radiopaque marker, optionally wherein the imaging technique is x-ray based imaging (e.g., fluoroscopy).

In some embodiments, the vertebra is a damaged, collapsed, or compromised vertebra, optionally wherein the damaged vertebra includes a vertebral compression fracture, and optionally wherein the damaged vertebra has a reduced height relative to an undamaged vertebra. In some embodiments, the method includes increasing the volume and/or the height of the vertebra.

In some embodiments, the bone fortifying material is provided as a first component material and a second component material, and the method further includes mixing the first component material and the second component material prior to step (c). In some embodiments, the volume of the bone fortifying material is 10 mL or less (e.g., about 7 mL or less, e.g., about from about 0.5 mL to about 8 mL, from about 1 mL to about 5 mL, from about 2 mL to about 6 mL, from about 4 mL to about 8 mL, from about 5 mL to about 10 mL, from about 5 mL to about 7 mL, e.g., about 0.1 mL, about 1 mL, about 2 mL, about 3 mL, about 4 mL, about 5 mL, about 6 mL, about 7 mL, about 8 mL, about 9 mL, or about 10 mL) and wherein the bone fortifying material is configured to harden. In some embodiments, wherein, after step (c), the bone fortifying material is confined within the implant and does not leak into the vertebral space.

In some embodiments, the flexible membrane is configured to permit leakage of the bone fortifying material through a superior side and/or an inferior side of the vertebral space (e.g., to fill in fracture lines) while inhibiting or reducing leakage of the bone fortifying material into an anterior side and/or a posterior side of the vertebral space (e.g., toward the spinal canal and the vessels).

In some embodiments, the actuator is attached to a handle of the device, wherein the handle further includes an inlet port in fluid communication with a lumen of the shaft of the device, and wherein the bone fortifying material is injected into the implant through the inlet port and via the shaft. In some embodiments, the handle includes a lumen (e.g., tubing) configured to provide fluid communication between the inlet port and the shaft. In some embodiments, the inlet port includes a valve (e.g., a luer-lock connection).

In some embodiments, the handle further includes a release mechanism configured to detach the shaft from the implant, wherein step (d) further includes activating the release mechanism, thereby detaching the shaft from the implant.

In a third aspect, the disclosure features a kit including: (i) the device of the first aspect; and optionally, (ii) a bone fortifying material; (iii) a handle, wherein the actuator and the display are located on the handle; (iv) a release mechanism attached to the handle; (v) a coaxial bone access system; and (vi) a bone drill. In some embodiments, the coaxial bone access system includes an access coaxial trocar system. In some embodiments, the kit further includes one or more of a delivery wire, a bone fortifying material (e.g., bone cement, such as, e.g., polymethylmethacrylate (PMMA)), and a bone fortifying material injection device.

Definitions

To facilitate an understanding of this disclosure, a number of terms are defined below. Terms defined herein have meanings as commonly understood by a person of ordinary skill in the areas relevant to the disclosure. Terms such as "a," "an," and "the" are not intended to refer to only a singular entity (unless context reveals otherwise) but include the general class of which a specific example can be used for illustration.

As used herein, the term "about" refers to a value that is within 10% above or below the value being described.

By "biocompatible," as used herein, is meant any material which is non-toxic to a subject (e.g., a human). A material that is biocompatible may remain in the body of a subject for an extended duration without the subject suffering any toxic effects resulting from the material (e.g., an immune reaction). The biocompatible material may remain in the body of the subject for a duration that may last at least 1 day, at least 2 days, at least 3 days, at least 4 days, at least 5 days, at least 6 days, at least 1 week, at least 2 weeks, at least 3 weeks, at least 1 month, at least 2 months, at least 3 months, at least 6 months, at least 1 year, at least 2 years, at least 3 years, at least 5 years, at least 10 years, at least 15 years, at least 20 years, at least 25 years, at least 30 years, at least 35 years, at least 40 years, at least 45 years, or at least 50 years, or for the lifetime of the subject. The biocompatible material may be resorbable, and may, over time, may be replaced by natural bone.

By "treating" or "treatment" is meant the medical management of a subject with the intent that an amelioration, repair, or prevention of an injury, disease, pathological condition, or disorder will result. Exemplary injuries, diseases, pathological conditions, or disorders that can be treated with the compositions and methods described herein include vertebral fractures (e.g., vertebral compression fractures) and diseases, pathological conditions, or disorders that may result in vertebral compression fractures (e.g., osteoporosis). Treatment may include increasing the height of a damaged vertebra (e.g., to the height of a undamaged vertebra). Treatment may include altering the relative angle between a damaged vertebra and its neighboring vertebrae (e.g., to the relative angle of an undamaged vertebra). "Treating" and "treatment" include active treatment, that is, treatment directed specifically toward improvement of the injury or disease, pathological condition, or disorder, and also includes causal treatment, that is, treatment directed toward removal of the cause of the injury or disease, pathological condition, or disorder. In addition, "treating" and "treatment" also include palliative treatment, that is, treatment designed for the relief of symptoms rather than the curing of the injury or disease, pathological condition, or disorder; preventive treatment, that is, treatment directed to prevention of the injury or disease, pathological condition, or disorder; and supportive treatment, that is, treatment employed to supplement another specific therapy directed toward the improvement of the injury or disease, pathological condition, or disorder. Particularly, "treating" and "treatment" as used herein include reducing pain (e.g., back pain) in a subject.

As used herein, any values provided in a range of values include both the upper and lower bounds, and any values contained within the upper and lower bounds.

BRIEF DESCRIPTION OF THE DRAWINGS

FIG. 4A is an image showing insertion of implant 1100 in a shortened state into a space created within a vertebral body 200 using access trocar 1160. FIG. 4B is an image showing heightening of implant 1100 within vertebral body 200 by retracting access trocar 1160 and operating actuator 1300. Implant 1100 is not shown to scale in FIG. 4B. The heightening of implant 1100 is accompanied by an increase in the width and a decrease in the length of implant 1100. Heightening of implant 1100 enlarges the space within vertebral body 200 and restores vertebral height. FIG. 4C is an image showing detachment of shaft 1200 from implant 1100 following injection of bone cement into implant 1100. The detachment is performed by operating release mechanism 1420. FIG. 4D shows the retracting of handle 1400 and shaft 1200, thereby leaving implant 1100 inside vertebral body 200.

DETAILED DESCRIPTION

The present disclosure features a device for performing a kyphoplasty procedure. The device includes a malleable implant, a shaft connected at a distal end thereof to the implant, and an actuator, which is enclosed in a handle, that is connected (e.g., through a mechanical or electronic coupling) to the proximal end of the implant via the shaft and controls the size (e.g., dimensions (e.g., height, length, and/or width)) of the implant. The implant of the kyphoplasty device is configured to be inserted into a vertebra of a subject (e.g., a human), such as a damaged, compromised, or collapsed vertebra, manipulated to a desired size (e.g., desired length, width, and/or height) through activation of the actuator, and subsequently filled with a bone fortifying material (e.g., a bone cement, such as, e.g., polymethylmethacrylate (PMMA), a calcium phosphate bone cement, or a calcium sulfate bone cement). The state of the implant and volume of bone fortifying material injected may be selected based on the patient's anatomy, such as the extent of damage to the damaged vertebra and the decrease in height caused by the damage.

Figure 2:
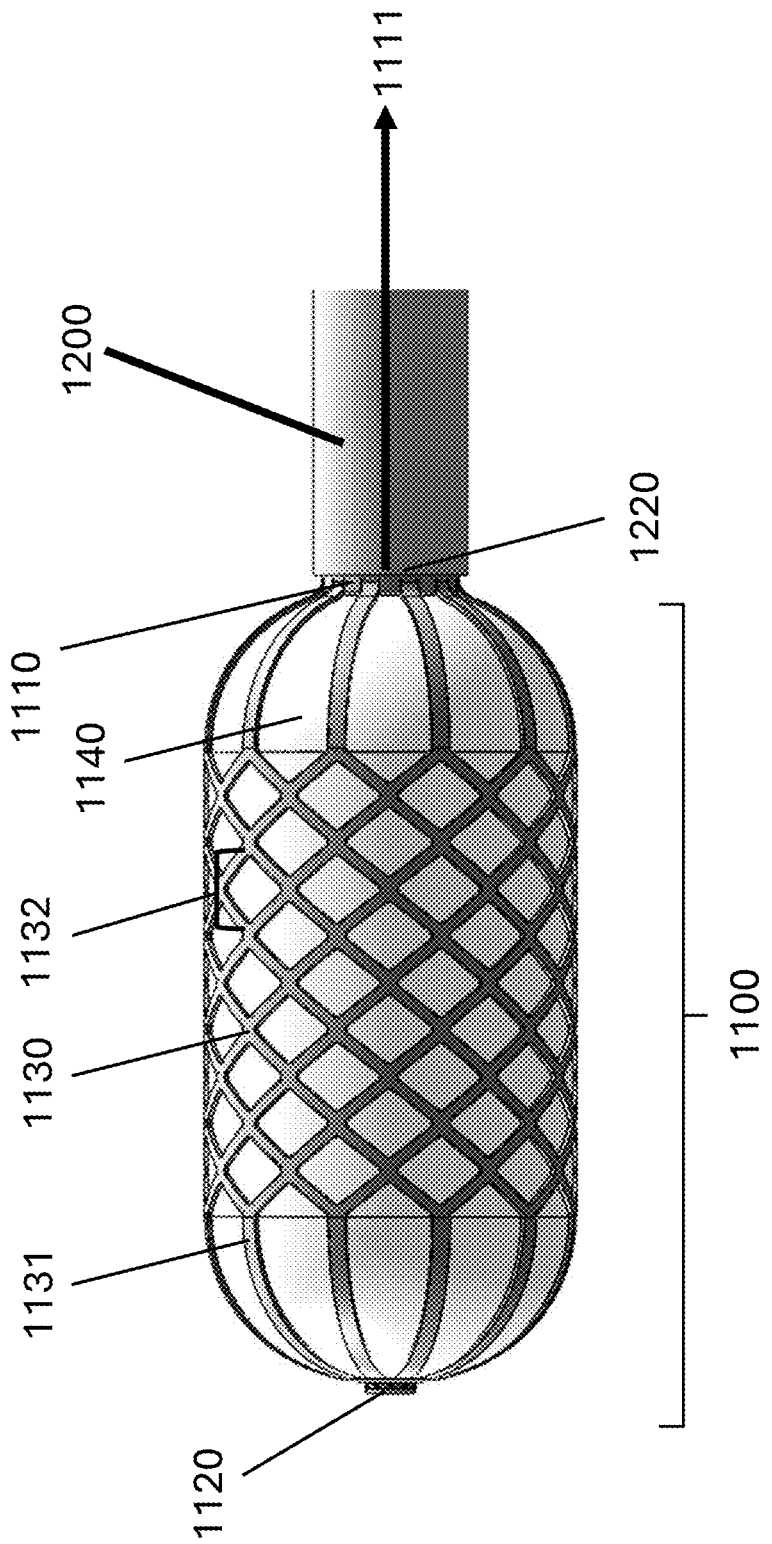
FIG. 2 is an image showing a close-up view of implant 1100 including proximal end 1110, distal end 1120, body 1130, and flexible membrane 1140. Distal end 1220 of shaft 1200 is shown attached to proximal end 1110 of implant 1100.
Figure 5:
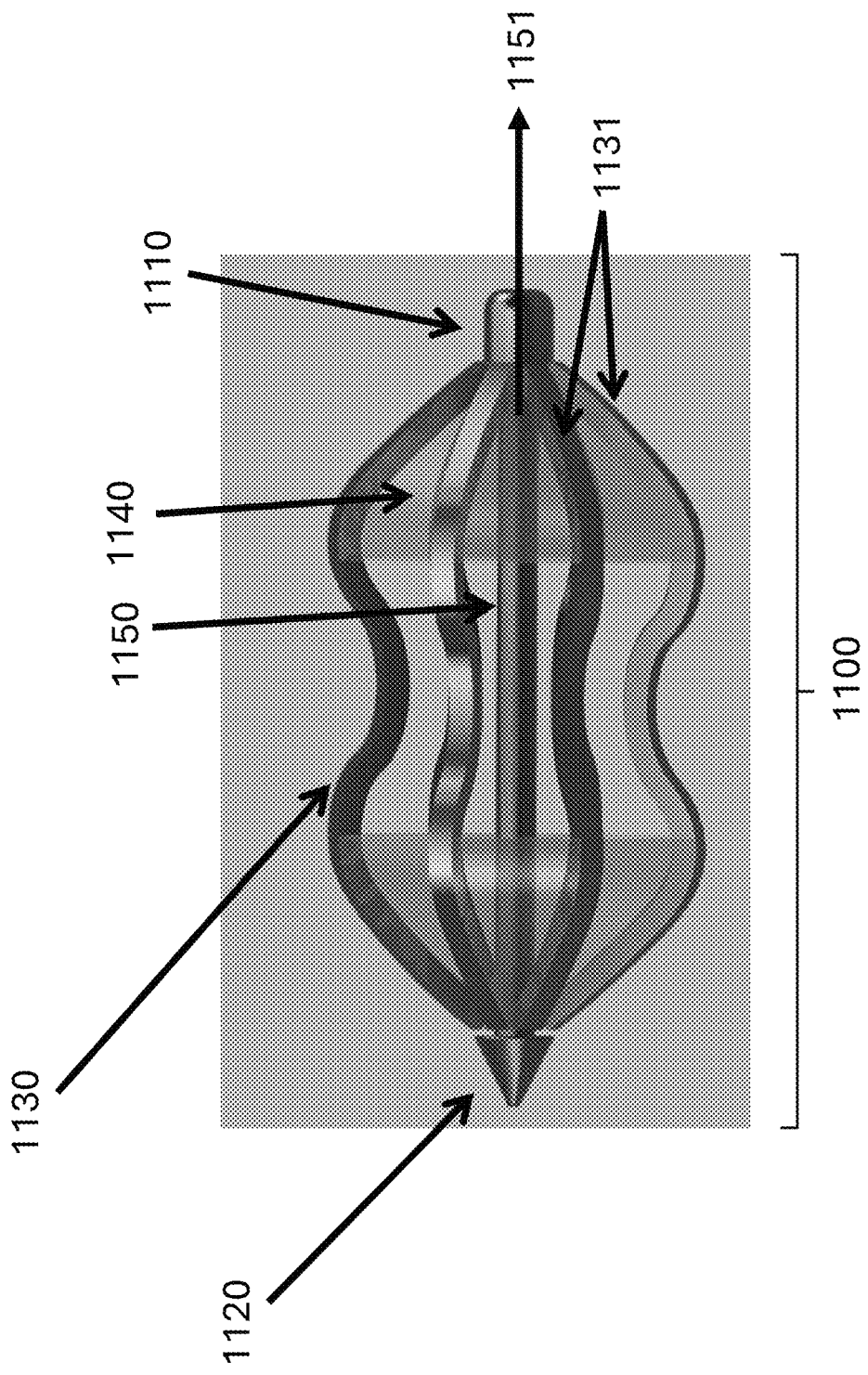
FIG. 5 is an image showing implant 1100 including proximal end 1110, distal end 1120, body 1130, flexible membrane 1140, and rod 1150 extending from proximal end 1110 to distal end 1120. Rod 1150 may include lumen 1151. Rod 1150 may also include one or more access channels (e.g., pores). The flexible membrane 1140 is shown partially covering body 1130. Proximal end 1110 is configured to be attached to distal end 1220 of shaft 1200.
Figure 6:
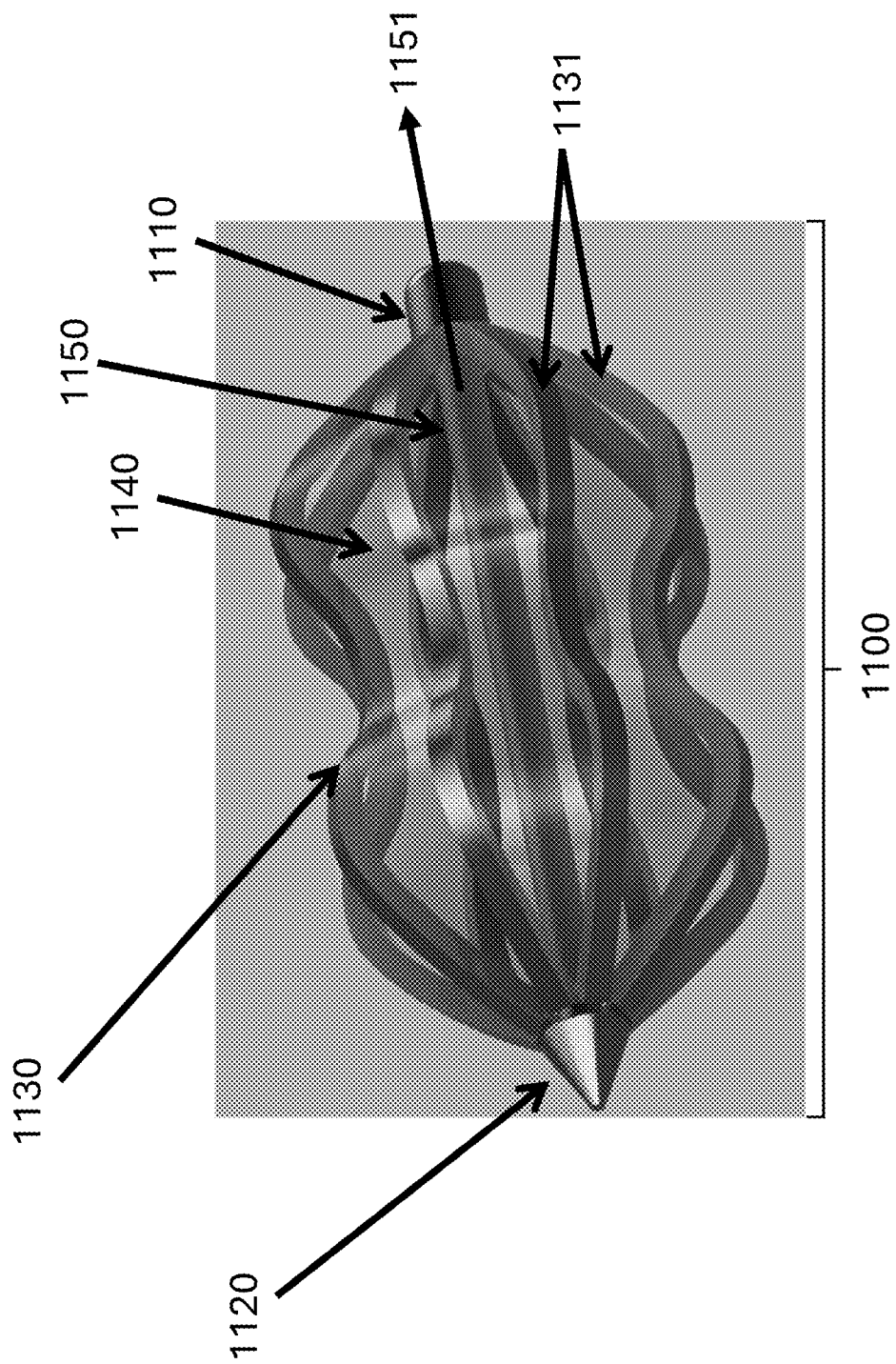
FIG. 6 is an image showing implant 1100 including proximal end 1110, distal end 1120, body 1130, flexible membrane 1140, and rod 1150 extending from proximal end 1110 to distal end 1120. Rod 1150 may include lumen 1151. Rod 1150 may also include one or more access channels (e.g., pores). Flexible membrane 1140 is shown fully covering body 1130. Proximal end 1110 is configured to be attached to distal end 1220 of shaft 1200.

Implant 1100 includes proximal end 1110, distal end 1120, body 1130, and optional flexible membrane 1140 (see, e.g., FIG. 2, FIG. 5, and FIG. 6). Proximal end 1110 may further include proximal lumen 1111, which provides fluidic access to an interior volume of implant 1100. Implant 1100 may further include rod 1150 extending between proximal end 1110 and distal end 1120 (see, e.g., FIGS. 5 and 6), which provides additional structural support for implant 1100 after deployment. Implant 1100 includes at least two states: an initial state and a deployed state. In both states, implant 1100 is defined by a length, a width, and a height. Implant 1100 may also be defined by a volume and a shape. Additionally, the height of implant 1100 may be fully or partially increased to a user-defined or pre-selected height, consequently altering the width and length of implant 1100. The length, width, and/or height of implant 1100 may differ between the initial state and deployed state. Implant 1100 may be provided to a practitioner in the initial state. The practitioner may then manipulate implant 1100 using actuator 1300 to heighten implant 1100 to any desired height. Implant 1100 may be coupled to a readout (e.g., a display, such as a mechanical display (e.g., a rotary disk) or a digital display) that is configured to show the current state (e.g., current height, length, width, and/or volume) of implant 1100 following manipulation (i.e., change in state of implant 1100).

Body 1130 is composed of a plurality of deformable (or malleable) struts 1131. The configuration of struts 1131 may form lattice cells 1132 (see, e.g., FIG. 2). Alternatively, struts 1131 may run along the length of implant 1100, converging at proximal end 1110 and distal end 1120 (see, e.g., FIGS. 5 and 6). The shape of struts 1131 may curved, including one or more curves along the length of each of struts 1131 (see, e.g., FIGS. 5 and 6). Accordingly, the cross-sectional dimension (e.g., diameter, width, and/or height) of implant 1100 may vary across a length of the device. The shape of lattice cells 1132 and struts 1131 may change as the state of implant 1100 changes (e.g., between the initial and deployed states). Struts 1131 may have any of a number of different shapes, and lattice cells 1132 formed by struts 1131 may have any of a number of different shapes, such as a polygonal, square, rectangular, triangular, diamond, circular, elliptical, oval, oblong, lens, asteroid, deltoid, slit, or amorphous shape. The shape and/or area of each of struts 1131 or configuration of struts 1131 relative to other struts of body 1130 may be identical, or a subset of struts 1131 may have a different shape or configuration. Consequently, each of lattice cells 1132 may have a different shape and/or area or may be identical across body 1130, or a subset of lattice cells 1132 may have a different shape and/or area. Body 1130 may include more than one different configuration, shape, and/or area of struts 1131, e.g., more than two different configuration, shape, and/or area of struts 1131, more than three different configuration, shape, and/or area of struts 1131, more than four different configuration, shape, and/or area of struts 1131, more than five different configuration, shape, and/or area of struts 1131, etc. Body 1130 may include more than one different shape and/or area of lattice cells 1132, e.g., more than two different shape and/or area of lattice cells 1132, more than three different shape and/or area of lattice cells 1132, more than four different shape and/or area of lattice cells 1132, more than five different shape and/or area of lattice cells 1132, etc.

Implant 1100 may be made completely or partially from a material that is configured to be reversibly deformable (e.g., the material may have shape memory). Body 1130 may be deformed (e.g., radially extended or contracted) and still return to its original shape. In other words, body 1130 may be elastically deformable. Implant 1100 may have a structural support to provide a more uniform and controllable transition from a first state to a second state.

Each state of implant 1100 may be characterized by a length, a width, a height, and a volume. The length of implant 1100 in the initial state may be from about 1 cm to about 10 cm (e.g., from about 2 cm to about 10 cm, from about 4 cm to about 10 cm, from about 6 cm to about 10 cm, from about 8 cm to about 10 cm, from about 1 cm to about 9 cm, from about 1 cm to about 3 cm, from about 4 cm to about 10 cm, from about 4 cm to about 8 am, from about 4 cm to about 6 cm, from about 3 cm to about 5 cm, from about 6 cm to about 10 cm, from about 6 cm to about 8 cm, from about 5 cm to about 7 cm, from about 8 cm to about 10 cm, from about 7 cm to about 9 cm, from about 9 cm to about 10 cm, from about 1 cm to about 5 cm, from about 5 cm to about 10 cm, e.g., about 1 cm, about 2 cm, about 3 cm, about 4 cm, about 5 cm, about 6 cm, about 7 cm, about 8 cm, about 9 cm, or about 10 cm). The length of implant 1100 in the initial state may be 1 cm, 1.5 cm, 2 cm, or 2.5 cm. The length of implant 1100 in a deployed state may be from about 0.5 cm to about 5 cm (e.g., from about 0.5 cm to about 1 cm, from about 0.5 cm to about 2.5 cm, from about 0.5 cm to about 4 cm, from about 1 cm to about 5 cm, from about 1 cm to about 4 cm, from about 1 cm to about 3 cm, from about 1 cm to about 2 cm, from about 2 cm to about 5 cm, from about 2 cm to about 4 cm, from about 2 cm to about 3 cm, from about 3 cm to about 5 cm, from about 3 cm to about 4 cm, from about 4 cm to about 5 cm, e.g., about 0.5 cm, about 1 cm, about 1.5 cm, about 2 cm, about 2.5 cm, about 3 cm, about 3.5 cm, about 4 cm, about 4.5 cm, or about 5 cm).

The width of implant 1100 in the initial state may be from about 0.5 cm to about 5 cm (e.g., from about 0.5 cm to about 1 cm, from about 0.5 cm to about 2.5 cm, from about 0.5 cm to about 4 cm, from about 1 cm to about 5 cm, from about 1 cm to about 4 cm, from about 1 cm to about 3 cm, from about 1 cm to about 2 cm, from about 2 cm to about 5 cm, from about 2 cm to about 4 cm, from about 2 cm to about 3 cm, from about 3 cm to about 5 cm, from about 3 cm to about 4 cm, from about 4 cm to about 5 cm, e.g., about 0.5 cm, about 1 cm, about 1.5 cm, about 2 cm, about 2.5 cm, about 3 cm, about 3.5 cm, about 4 cm, about 4.5 cm, or about 5 cm). The width of implant 1100 in a deployed state may be from about 1 to about 10 cm (e.g., from about 2 cm to about 10 cm, from about 4 cm to about 10 cm, from about 6 cm to about 10 cm, from about 8 cm to about 10 cm, from about 1 cm to about 9 cm, from about 1 cm to about 3 cm, from about 4 cm to about 10 cm, from about 4 cm to about 8 am, from about 4 cm to about 6 cm, from about 3 cm to about 5 cm, from about 6 cm to about 10 cm, from about 6 cm to about 8 cm, from about 5 cm to about 7 cm, from about 8 cm to about 10 cm, from about 7 cm to about 9 cm, from about 9 cm to about 10 cm, from about 1 cm to about 5 cm, from about 5 cm to about 10 cm, e.g., about 1 cm, about 2 cm, about 3 cm, about 4 cm, about 5 cm, about 6 cm, about 7 cm, about 8 cm, about 9 cm, or about 10 cm).

The height of implant 1100 in the initial state may be from about 0.2 cm to about 1 cm (e.g., from about 0.2 cm to about 0.8 cm, from about 0.2 cm to about 0.6 cm, from about 0.2 cm to about 0.4 cm, from about 0.3 cm to about 0.5 cm, from about 0.4 cm to about 1 cm, from about 0.4 cm to about 0.8 cm, from about 0.4 cm to about 0.6 cm, from about 0.5 cm to about 0.7 cm, from about 0.5 cm to about 1 cm, from about 0.6 cm to about 1 cm, from about 0.6 cm to about 0.8 cm, from about 0.7 cm to about 0.9 cm, from about 0.7 cm to about 1 cm, from about 0.8 cm to about 1 cm, e.g., about 0.2 cm, about 0.3 cm, about 0.4 cm, about 0.5 cm, about 0.6 m, about 0.7 cm, about 0.8 cm, about 0.9 cm, or about 1 cm). The height of implant 1100 in a deployed state may be from about 0.3 cm to about 5 cm (e.g., from about 0.3 cm to about 0.5 cm, from about 0.3 cm to about 1 cm, from about 0.3 cm to about 2 cm, from about 0.3 cm to about 3 cm, from about 0.3 cm to about 4 cm, from about 0.5 cm to about 5 cm, from about 0.5 cm to about 1 cm, from about 0.5 cm to about 2.5 cm, from about 0.5 cm to about 4 cm, from about 1 cm to about 5 cm, from about 1 cm to about 4 cm, from about 1 cm to about 3 cm, from about 1 cm to about 2 cm, from about 2 cm to about 5 cm, from about 2 cm to about 4 cm, from about 2 cm to about 3 cm, from about 3 cm to about 5 cm, from about 3 cm to about 4 cm, from about 4 cm to about 5 cm, e.g., about 0.3 cm, about 0.4 cm, about 0.5 cm, about 0.6 cm, about 0.7 cm, about 0.8 cm, about 0.9 cm, about 1 cm, about 1.5 cm, about 2 cm, about 2.5 cm, about 3 cm, about 3.5 cm, about 4 cm, about 4.5 cm, or about 5 cm).

The cross-sectional dimension (e.g., diameter, width, and/or height) of implant 1100 may vary across a length of the device. Alternatively, the cross-sectional dimension (e.g., diameter, width, and/or height) of implant 1100 may be constant across a length of the device The volume of implant 1100 in the initial state may be from about 0.15 mL to about 25 mL (e.g., from about 0.15 mL to about 20 mL, from about 0.15 mL to about 15 mL, from about 0.15 mL to about 10 mL, from about 0.15 mL to about 5 mL, from about 0.15 mL to about 2.5 mL, from about 0.15 mL to about 1 mL, from about 0.15 mL to about 0.5 mL, from about 0.15 mL to about 0.25 mL, from about 0.25 mL to about 0.5 mL, from about 0.25 mL to about 1 mL, from about 0.5 mL to about 1.0 mL, from about 1 mL to about 5 mL, from about 1 mL to about 10 mL, from about 1 mL to about 20 mL, from about 1 mL to about 25 mL, from about 5 mL to about 10 mL, from about 5 mL to about 15 mL, from about 5 mL to about 20 mL, from about 5 mL to about 25 mL, from about 10 mL to about 15 mL, from about 10 mL to about 20 mL, from about 10 mL to about 25 mL, from about 15 mL to about 20 mL, from about 15 mL to about 25 mL, from about 20 mL to about 25 mL, e.g., about 0.15 mL, about 0.2 mL, about 0.25 mL, about 0.3 mL, about 0.35 mL, about 0.4 mL, about 0.45 mL, about 0.5 mL, about 0.55 mL, about 0.6 mL, about 0.7 mL, about 0.8 mL, about 0.9 mL, about 1 mL, about 2 mL, about 3 mL, about 4 mL, about 5 mL, about 6 mL, about 7 mL, about 8 mL, about 9 mL, about 10 mL, about 11 mL, about 12 mL, about 13 mL, about 14 mL, about 15 mL, about 16 mL, about 17 mL, about 18 mL, about 19 mL, about 20 mL, about 21 mL, about 22 mL, about 23 mL, about 24 mL, or about 25 mL).

The volume of implant 1100 in a deployed state may be from about 0.15 mL to about 25 mL (e.g., from about 0.15 mL to about 20 mL, from about 0.15 mL to about 15 mL, from about 0.15 mL to about 10 mL, from about 0.15 mL to about 5 mL, from about 0.15 mL to about 2.5 mL, from about 0.15 mL to about 1 mL, from about 0.15 mL to about 0.5 mL, from about 0.15 mL to about 0.25 mL, from about 0.25 mL to about 0.5 mL, from about 0.25 mL to about 1 mL, from about 0.5 mL to about 1.0 mL, from about 1 mL to about 5 mL, from about 1 mL to about 10 mL, from about 1 mL to about 20 mL, from about 1 mL to about 25 mL, from about 5 mL to about 10 mL, from about 5 mL to about 15 mL, from about 5 mL to about 20 mL, from about 5 mL to about 25 mL, from about 10 mL to about 15 mL, from about 10 mL to about 20 mL, from about 10 mL to about 25 mL, from about 15 mL to about 20 mL, from about 15 mL to about 25 mL, from about 20 mL to about 25 mL, e.g., about 0.15 mL, about 0.2 mL, about 0.25 mL, about 0.3 mL, about 0.35 mL, about 0.4 mL, about 0.45 mL, about 0.5 mL, about 0.55 mL, about 0.6 mL, about 0.7 mL, about 0.8 mL, about 0.9 mL, about 1 mL, about 2 mL, about 3 mL, about 4 mL, about 5 mL, about 6 mL, about 7 mL, about 8 mL, about 9 mL, about 10 mL, about 11 mL, about 12 mL, about 13 mL, about 14 mL, about 15 mL, about 16 mL, about 17 mL, about 18 mL, about 19 mL, about 20 mL, about 21 mL, about 22 mL, about 23 mL, about 24 mL, or about 25 mL). The volume of implant 1100 may be the same in a deployed state compared to the initial state. The decrease in length of implant 1100 may result in an increase of width and height of implant 1100, maintaining the volume of implant 1100.

Also, an increase in length of implant 1100 may result in a decrease in width and height of implant 1100, maintaining the volume of implant 1100.

The manipulation of implant 1100 to a desired height may be performed via actuator 1300. Actuator 1300 may be electronically or mechanically coupled to implant 1100, e.g., at proximal end 1110, such that operation of actuator 1300 changes the volume of implant 1100 by moving proximal end 1110 of implant 1100 towards or away from distal end 1120 of implant 1100. Actuator 1300 may include a first state (e.g., an initial state) corresponding to the state of implant 1100 when it is ready to be inserted into a vertebra and an activated state that includes a plurality of deployed states that can be selected by a user or pre-defined and that correspond to a particular height of implant 1100. Operation of actuator 1300 to a specific deployed state causes heightening of implant 1100 to a corresponding height. An increase in the height of implant 1100 may correspond with a decrease in the length and/or an increase in the width of implant 1100. Actuator 1300 can also be operated to cause implant 1100 to return to the initial state (e.g., back to an elongated state) or an intermediate state between the fully deployed state and the initial state. Transition of implant 1100 back to the initial state or to an intermediate deployed state may cause a decrease in the height of implant 1100 along with and increase in the length and/or a decrease in the width of implant 1100. Handle 1400 of device 100 may include an indicator, such as a readout or display (e.g., display 1430, e.g., a mechanical display (e.g., a rotary disk) or a digital display), associated with actuator 1300 that includes one or more indicia indicating the height, length, and width of implant 1100 that changes as implant 1100 is transitioned from a first state to a second state (e.g., heightened or shortened). The one or more indicia may also include the volume of bone fortifying material required to fill the implant.

Implant 1100 and actuator 1300 are connected via shaft 1200. Shaft 1200 includes proximal end 1210 and distal end 1220 with a length therebetween, and lumen 1230 spanning the length of shaft 1200. Distal end 1220 may be attached to proximal end 1110 of implant 1100 and proximal end 1210 may be attached to or coupled to handle 1400 such that lumen 1230 of shaft 1200 is in fluid communication with proximal lumen 1110 of implant 1100. The connection between implant 1100 and shaft 1200 may be reversible. Implant 1100, shaft 1200, and actuator 1300 may be coupled (e.g., mechanically coupled or electronically coupled) such that operation of actuator 1300 may transmit a signal (e.g., a mechanical signal (e.g., strain) or an electronic signal) from actuator 1300 to implant 1100 via shaft 1200.

Shaft 1200 may be characterized by a length, an inner diameter (defining the diameter of lumen 1230), and an outer diameter. The length of shaft 1200 may be from about 5 cm to about 50 cm (e.g., from about 5 cm to about 40 cm, from about 5 cm to about 30 cm, from about 5 cm to about 25 cm, from about 5 cm to about 20 cm, from about 5 cm to about 10 cm, from about 10 cm to about 50 cm, from about 10 cm to about 40 cm, from about 10 cm to about 30 cm, from about 10 cm to about 20 cm, from about 20 cm to about 50 cm, from about 20 cm to about 40 cm, from about 20 cm to about 30 cm, from about 30 cm to about 50 cm, from about 30 cm to about 40 cm, from about 40 cm to about 50 cm, from about 25 cm to about 50 cm, e.g., about 5 cm, about 6 cm, about 7 cm, about 8 cm, about 9 cm, about 10 cm, about 15 cm, about 20 cm, about 25 cm, about 30 cm, about 35 cm, about 40 cm, about 45 cm, or about 50 cm). The inner diameter of shaft 1200 may be from about 1 mm to about 30 mm (e.g., from about 1 mm to about 25 mm, from about 1 mm to about 20 mm, from about 1 mm to about 15 mm, from about 1 mm to about 10 mm, from about 1 mm to about 5 mm, from about 1 mm to about 3 mm, from about 5 mm to about 30 mm, from about 5 mm to about 25 mm, from about 5 mm to about 20 mm, from about 5 mm to about 15 mm, from about 5 mm to about 10 mm, from about 10 mm to about 30 mm, from about 10 mm to about 25 mm, from about 10 mm to about 20 mm, from about 10 mm to about 15 mm, from about 15 mm to about 30 mm, from about 15 mm to about 25 mm, from about 15 mm to about 20 mm, from about 20 mm to about 30 mm, from about 20 mm to about 25 mm, from about 25 mm to about 30 mm, e.g., about 1 mm, about 2 mm, about 3 mm, about 4 mm, about 5 mm, about 6 mm, about 7 mm, about 8 mm, about 9 mm, about 10 mm, about 12 mm, about 15 mm, about 18 mm, about 20 mm, about 22 mm, about 25 mm, about 28 mm, or about 30 mm). The outer diameter of shaft 1200 may be from about 1.1 cm to 30.9 cm (from about 1.1 cm to about 2 cm, from about 1.1 cm to about 1.5 cm, from about 2 cm to about 5 cm, from about 5 cm to about 30 cm, from about 5 cm to about 25 cm, from about 5 cm to about 20 cm, from about 5 cm to about 10 cm, from about 10 cm to about 30 cm, from about 10 cm to about 25 cm, from about 10 cm to about 20 cm, from about 10 cm to about 15 cm, from about 15 cm to about 20 cm, from about 15 cm to about 25 cm, from about 15 cm to about 30 cm, from about 20 cm to about 25 cm, from about 20 cm to about 30 cm, from about 25 cm to about 30 cm, e.g., about 1.1 cm. about 1.2 cm, about 1.3 cm, about 1.4 cm, about 1.5 cm, about 2 cm, about 3 cm, about 4 cm, about 5 cm, about 6 cm about 7 cm, about 8 cm, about 9 cm, about 10 cm, about 15 cm, about 20 cm, about 25 cm, about 30 cm, about 30.5 cm, or about 30.9 cm).

Shaft 1200 and actuator 1300 may be attached to a handle (e.g., handle 1400) configured to be held by an operator. Shaft 1200 may be attached to handle 1400 at proximal end 1210. Handle 1400 may include any further electronic or mechanical components (e.g., motors, wires, batteries, etc.) required for operation of shaft 1200 or actuator 1300. Handle 1400 may include inlet port 1410. Inlet port 1410 is in fluid communication with lumen 1230 of shaft 1200. Inlet port 1410 is configured to supply a material (e.g., a liquid or semi-solid phase bone fortifying material (e.g., a bone cement)) to implant 1100 (e.g., to the lumen of implant 1100). Handle 1400 may include release mechanism 1420, configured to release the reversible connection between implant 1100 and shaft 1200, thereby separating implant 1100 and shaft 1200.

Figure 7:
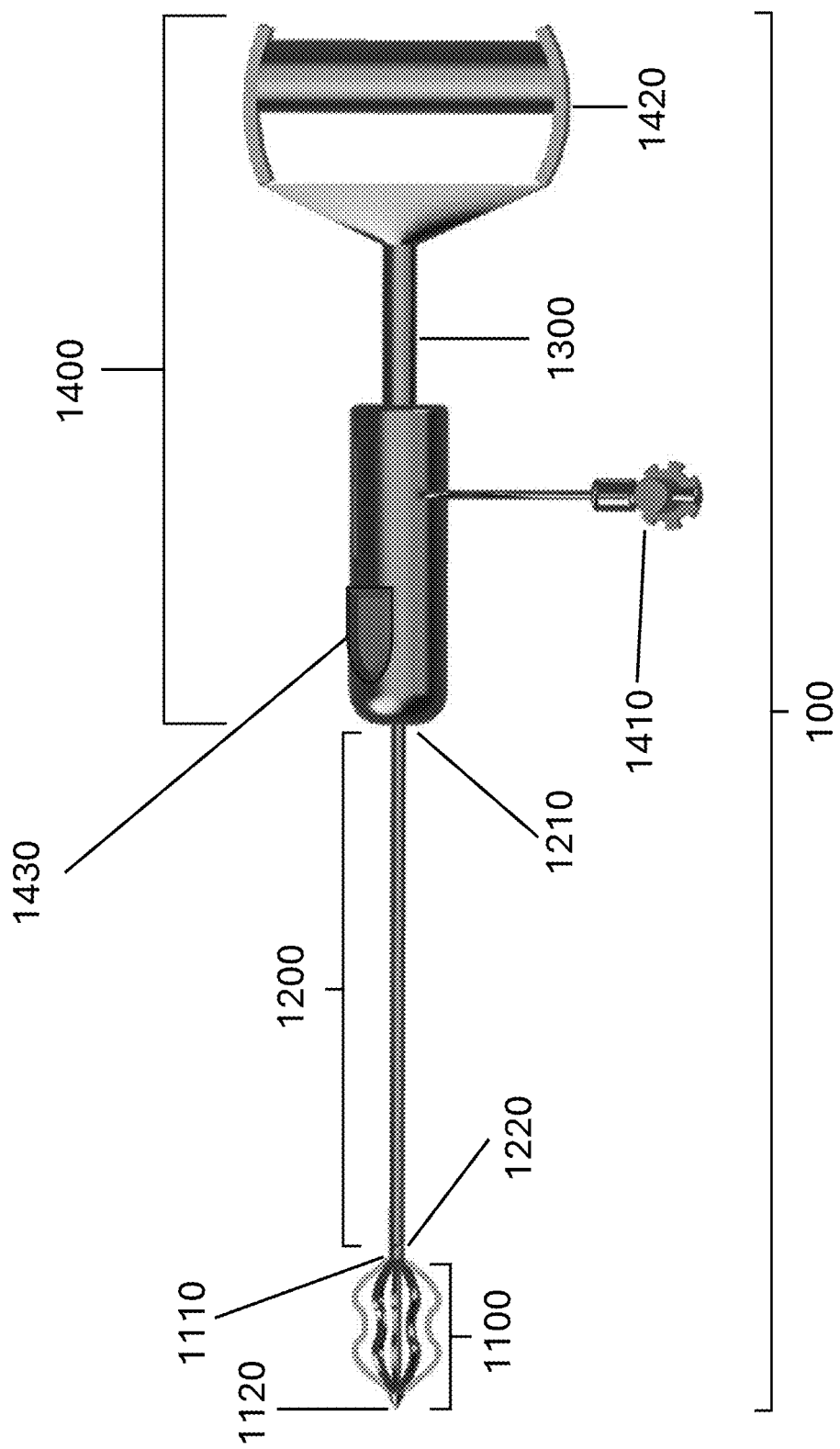
FIG. 7 is an image showing device 100 including implant 1100, elongate member (shaft) 1200, and handle 1400. Implant 1100 includes proximal end 1110 and distal end 1120. Shaft 1200 includes proximal end 1210 and distal end 1220. Handle 1400 includes actuator 1300, inlet port 1410, and release mechanism 1420. Actuator 1300 and release mechanism 1420 are shown physically connected. Proximal end 1110 of implant 1100 is reversibly attached to distal end 1220 of shaft 1200. Handle 1400 also includes display 1430.

A device of the present disclosure may further include display 1430 configured to show the current state of implant 1100, such as the initial state, the deployed state, or a state therebetween, of the implant (see, e.g., display 1430 of implant 1100 in FIG. 7). Display 1430 may be operatively connected to actuator 1300, such that display 1430 identifies the current dimensions of implant 1100 based on the current state of actuator 1300. By including display 1430, an operator may be able to easily determine the total volume of a space created in vertebral body 200 by implant 1100. A volume of a bone fortifying material (e.g., a bone cement) may then be provided (e.g., injected) into implant 1100, which is present in the vertebral space of vertebral body 200, via inlet port 1410. This volume may be precisely measured to fill the vertebral space in vertebral body 200 (e.g., at most 20% larger or smaller than the volume of the vertebral space, at most 15% larger or smaller than volume of the vertebral space, at most 10% larger or smaller than the volume of the vertebral space, at most 5% larger or smaller than volume of the vertebral space, at most 4% larger or smaller than the volume of the vertebral space, at most 3% larger or smaller than the volume of the vertebral space, at most at most 2% larger or smaller than the volume of vertebral body 200, or at most 1% larger or smaller than the volume of vertebral body 200). The volume of bone fortifying material injected into implant 1100 may be greater than about 0 mL to about 25 mL (e.g., from about 0.5 mL to about 8 mL, from about 1 mL to about 5 mL, from about 2 mL to about 6 mL, from about 2 mL to about 3 mL, from about 2 mL to about 4 mL, from about 4 mL to about 8 mL, from about 5 mL to about 10 mL, from about 5 mL to about 7 mL, from about 5 mL to about 25 mL, from about 10 mL to about 25 mL, e.g., about 0.1 mL, about 1 mL, about 2 mL, about 3 mL, about 4 mL, about 5 mL, about 6 mL, about 7 mL, about 8 mL, about 9 mL, about 10 mL, about 11 mL, about 12 mL, about 13 mL, about 14 mL, about 15 mL, about 16 mL, about 17 mL, about 18 mL, about 19 mL, about 20 mL, about 21 mL, about 22 mL, about 23 mL, about 24 mL, or about 25 mL, e.g., at most 7 mL).

Implant

A device of the present disclosure includes implant 1100. Implant 1100 may be used for performing kyphoplasty. Implant 1100 includes proximal end 1110, distal end 1120, body 1130, and flexible membrane 1140. Implant 1100 optionally includes rod 1150 extending from proximal end 1110 to distal end 1120. Implant 1100 includes at least two states. The first state may be an initial state (i.e., ready for insertion into a vertebrae), and the second state may be a deployed state (e.g., a state ready to receive a bone fortifying material or that has received a bone fortifying material). Implant 1100 is malleable and is configured to transition between these two states. For example, implant 1100 may be provided to an operator of the device in an initial state (i.e., prior to any manipulation). The operator may then activate (or manipulate) implant 1100 to have any desired or preselected dimensions (e.g., length, width, and/or height) using actuator 1300 and/or a bone fortifying material (e.g., a bone cement).

Figure 4A:
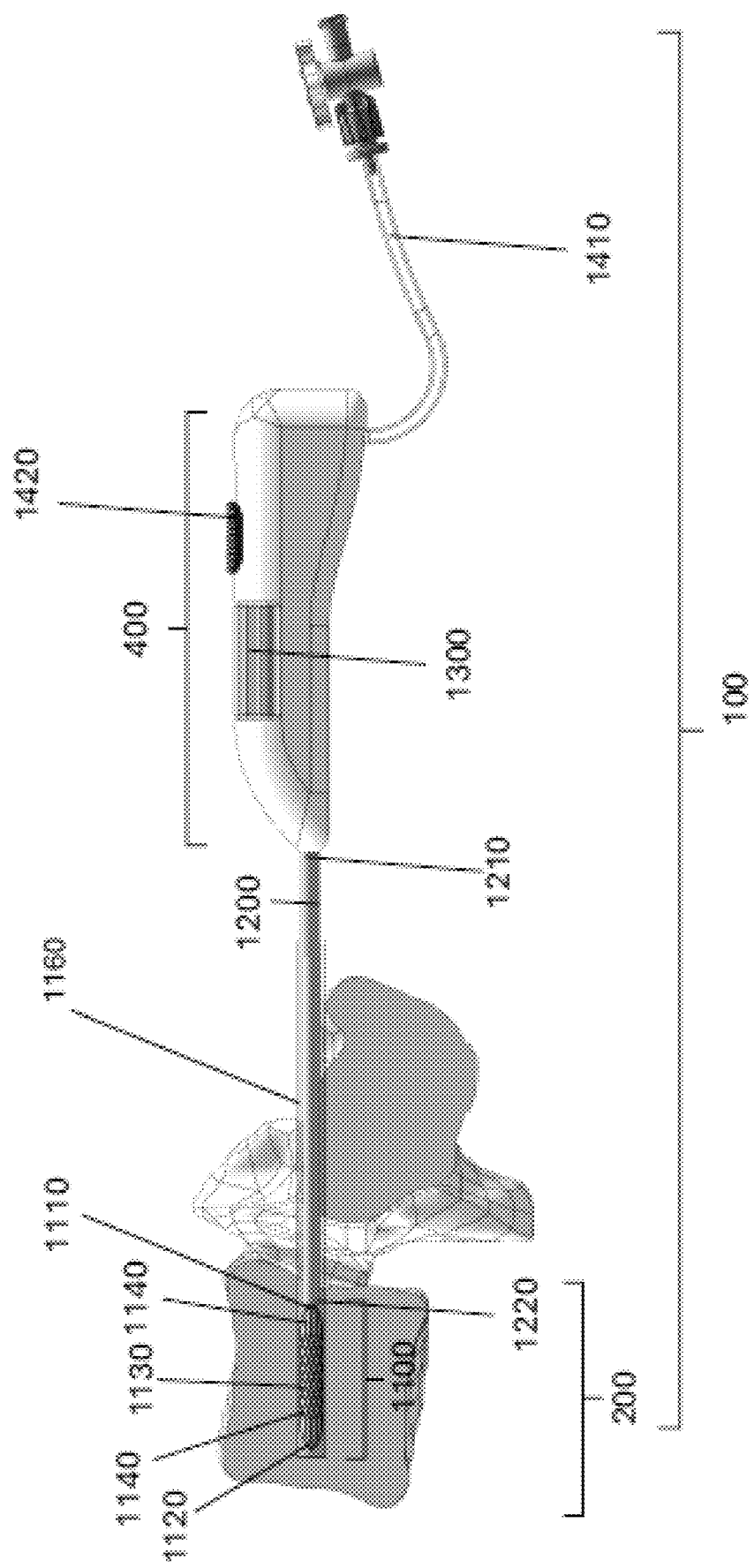
FIGS. 4A-4D are images showing the operation of a device of the disclosure.
Figure 4B:
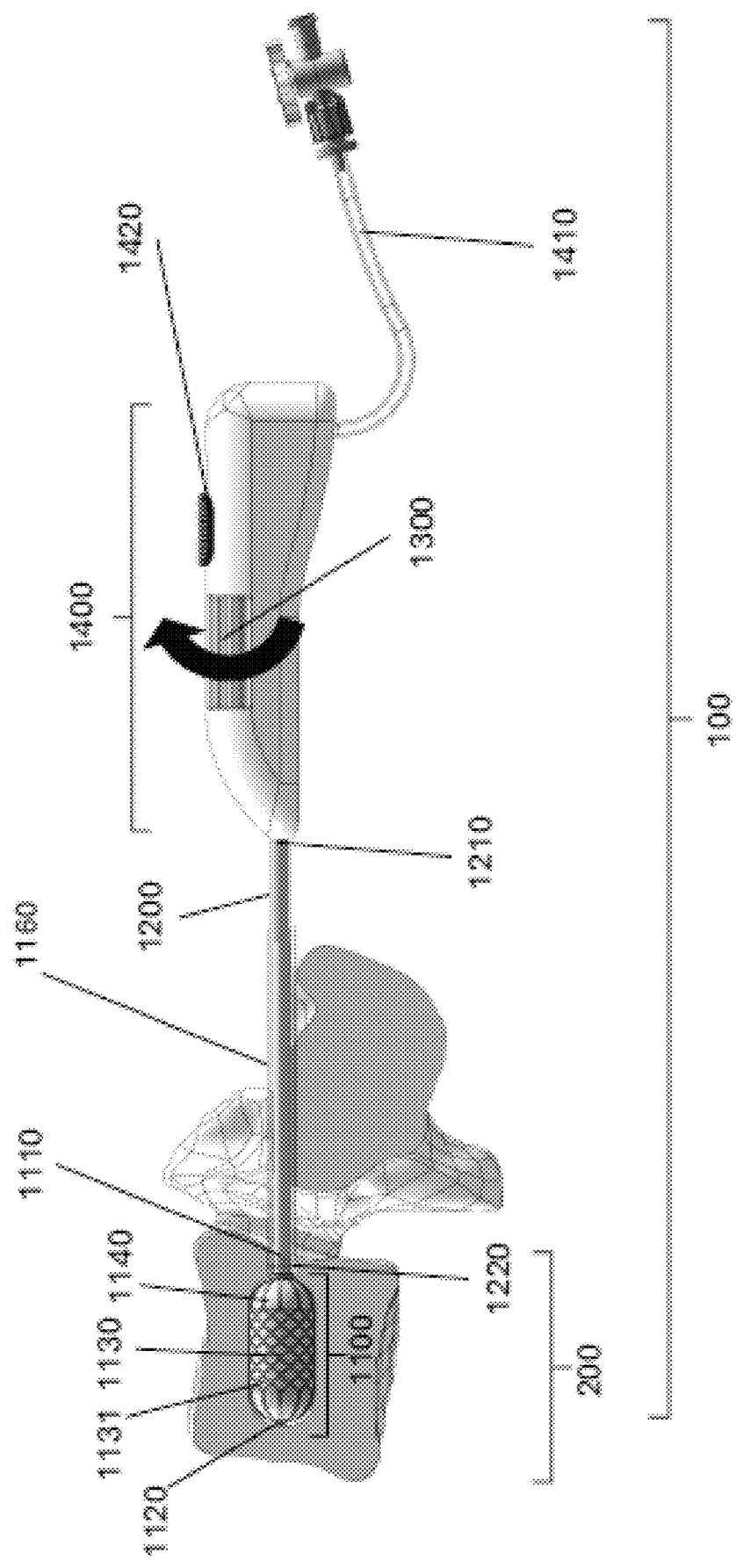

Transition of implant 1100 from a first state (e.g., an initial state or a shortened state) to a second state (e.g., heightened state or deployed state) is shown in FIGS. 4A-4B. Manipulation of implant 1100 to a shortened state results in a decrease in the height of implant 1100, which may be accompanied by a decrease of the width and increase in the length of implant 1100. Conversely, manipulation of implant 1100 to a heightened state results in an increase in the height of implant 1100, which may be accompanied by an increase of the width and decrease in the length of implant 1100. Accordingly, the volume of implant 1100 may remain substantially constant between each state, including each deployed state and the initial state. Furthermore, the position of implant 1100 relative to distal end 1120 may remain unchanged within the vertebra during the transition from a first state to a second state due to pinning of distal end 1120 against the vertebra. In each state, implant 1100 may be shaped as a sphere, ovoid, or cylinder. Implant 1100 may be shaped as a dimpled ovoid, wherein the center of the ovoid curves inward along the perimeter of implant 1100 (see, e.g., FIGS. 5 and 6). Implant 1100 may include lumen 1111 at proximal end 1100 for delivery of bone fortifying material within the internal volume of implant 1100 (see, e.g., FIG. 2).

Implant 1100 may include rod 1150 extending between proximal end 1110 and distal end 1120 (see, e.g., FIGS. 5 and 6). Rod 1150 may provide additional structural support for implant 1100 after deployment. Rod 1150 may include lumen 1151 that is fluidically connected to lumen 1230 of shaft 1200. To allow injection of bone fortifying material into body 1130 to fill implant 1100, rod 1150 may include a plurality of openings (e.g., holes, slits, grooves, or access channels). Alternatively, rod 1150 may not include lumen 1151. With this, bone fortifying material may flow from lumen 1230 of shaft 1200 around rod 1150 to fill implant 1100.

Body 1130 is composed of a plurality of deformable (or malleable) struts 1131. The configuration of struts 1131 may form lattice cells 1132 (see, e.g., FIG. 2). Alternatively, struts 1131 may run along the length of implant 1100, converging at proximal end 1110 and distal end 1120 and spaced apart therebetween (see, e.g., FIGS. 5 and 6). The shape of struts 1131 may be curved, including one or more curves along the length of each of struts 1131 (see, e.g., FIGS. 5 and 6). Accordingly, the cross-sectional dimension (e.g., diameter, width, and/or height) of implant 1100 may vary across a length of the device. The shape of lattice cells 1132 and struts 1131 may change between states of implant 1100. Struts 1131 may have any of a number of different shapes, and lattice cells 1132 formed by struts 1131 may have any of a number of different shapes, such as a polygonal, square, rectangular, triangular, diamond, circular, elliptical, oval, oblong, lens, asteroid, deltoid, slit, or amorphous shape. The shape and/or area of each of struts 1131 or configuration of struts 1131 relative to other struts of body 1130 may be identical, or a subset of struts 1131 may have a different shape or configuration. Consequently, each of lattice cells 1132 may have a different shape and/or area or may be identical across body 1130, or a subset of lattice cells 1132 may have a different shape and/or area. Body 1130 may include more than one different configuration, shape, and/or area of struts 1131, e.g., more than two different configuration, shape, and/or area of struts 1131, more than three different configuration, shape, and/or area of struts 1131, more than four different configuration, shape, and/or area of struts 1131, more than five different configuration, shape, and/or area of struts 1131, etc. Body 1130 may include more than one different shape and/or area of lattice cells 1132, e.g., more than two different shape and/or area of lattice cells 1132, more than three different shape and/or area of lattice cells 1132, more than four different shape and/or area of lattice cells 1132, more than five different shape and/or area of lattice cells 1132, etc.

Body 1130 may be composed of a material which is flexible (or malleable) enough to allow manipulation between the states of implant 1100, and rigid enough to inhibit collapse upon application of pressure from a vertebra on implant 1100. Body 1130 may be composed of nitinol, stainless steel, and/or platinum.

Flexible membrane 1140 is disposed on struts 1130 such that it fully or partially fluidically seals the interior volume of body 1130. Flexible membrane 1140 is configured to retain a bone fortifying material injected into implant 1100. Compared to existing implants for kyphoplasty, implant 1100 can include flexible membrane 1140 for directing the flow of bone fortifying material. In particular, flexible membrane 1140 may inhibit the flow of a bone fortifying material into the body, such as posteriorly towards the spinal canal or anteriorly towards the vessels. Alternatively, flexible membrane 1140 may allow the flow of bone fortifying material into the body, such as superiorly and/or inferiorly within the vertebral space to penetrate and fill fracture lines while also inhibiting the flow posteriorly and/or anteriorly towards the spinal canal and the vessels. Flexible membrane 1140 may be composed of a continuous material disposed on the entire exterior and/or interior surface of body 1130 (see, e.g., FIG. 6). Alternatively, flexible membrane may be composed of a continuous material partially disposed on the exterior and/or interior surface of body 1130 (see, e.g., FIG. 5). Flexible membrane 1140 may also be composed of a flexible material capable of withstanding repeated manipulation (e.g., radially extended or contracted). In other words, flexible membrane 1140 may be elastically deformable. Flexible membrane 1140 may be a biocompatible material which can remain in the vertebra of a subject (e.g., a human) with no long-term negative effects. Flexible membrane 1140 may be composed of, e.g., tetrafluoroethylene (PTFE) and/or a polyester (e.g., a polyester fiber, e.g., Dacron).

Shaft

A device of the present disclosure includes a shaft, e.g., shaft 1200. Shaft 1200 includes proximal end 1210 and distal end 1220 with a length therebetween. Shaft 1200 also includes lumen 1230 spanning the length of shaft 1200. Distal end 1220 of shaft 1200 is reversibly attached to proximal end 1110 of implant 1100, thereby attaching shaft 1200 to implant 1100. The attachment between distal end 1220 and proximal end 1110 is such that lumen 1230 and lumen 1111 are fluidically connected. Proximal end 1220 may be attached to handle 1400. Distal end 1220 may include a release mechanism configured to receive a signal from release mechanism 1420, and either detach or attach to proximal end 1110 of implant 1100. The attachment between implant 1100 and shaft 1200 may include a loop, a fastener, a hook, a screw connection, or a magnet. When the attachment between implant 1100 and shaft 1200 includes a loop, fastener, or hook, the release mechanism may include lifting the loop, fastener, or hook to break the attachment. When the attachment between implant 1100 and shaft 1200 includes a screw connection (e.g., a threaded insert and complementary screw), the release mechanism may include twisting the connection at either proximal end 1110 or distal end 1220. When the attachment between implant 1100 and shaft 1200 includes a magnet (e.g., an electromagnet), the release mechanism may include turning off or reducing the magnetic field at either proximal end 1110 or distal end 1220, thereby allowing implant 1100 and shaft 1200 to separate.

Shaft 1200 may be composed of a biocompatible material, such as a biocompatible plastic (e.g., polystyrene, polypropylene, polyvinyl chloride, polyethylene, polyurethane, polycarbonate, polyethylene terephthalate, or polyetheretherketone), a biocompatible metal (e.g., cobalt, chromium, titanium, platinum, zirconium, or iron), or a biocompatible oxide or alloy thereof (e.g., titanium oxides or steels).

Actuators, Release Mechanisms, and Displays

A device of the present disclosure includes an actuator, e.g., actuator 1300, and a release mechanism 1420. Each actuator may control a mechanical motion within a component of the device and allow an operator to manipulate the device. For example, actuator 1300 is operatively coupled to implant 1100 such that operation of actuator 1300 allows the operator to select a height of implant 1100. As a further example, release mechanism 1420 may be operatively coupled to distal end 1220 of shaft 1200 and/or proximal end 1110 of implant 1100 such that operation of release mechanism 1420 releases the reversible connection between implant 1100 and shaft 1200, thereby separating implant 1100 and shaft 1200. The coupling between actuator 1300 and the component it manipulates may be mechanical or electronic.

Actuators of the present disclosure may include two states an initial state and an "activated" state (e.g., a deployed state). Actuator 1300 may be adjusted (manually or digitally) to select a desired height for implant 1100. Release mechanism 1420 is configured upon activation to detach implant 1100 from shaft 1200. The attachment between implant 1100 and shaft 1200 may be reversible, such that once detached, implant 1100 and shaft 1200 may be reattached. Such reattachment may be performed by first aligning implant 1100 and shaft 1200 to an appropriate position (e.g., aligning proximal end 1110 and distal end 1220), then re-activating release mechanism 1420 to re-engage implant 1100 and shaft 1200.

Actuator 1300 and release mechanism 1420 may take any appropriate form. For example, either actuator 1300 or release mechanism 1420 may include a lever, a rotating mechanism (e.g., a dial or a knob), a push-button, or a slide block. Actuator 1300 and release mechanism 1420 may take on other forms, such as those described in, e.g., U.S. Pat. Nos. 8,465,414; 9,358,682; and 11,141,233, the actuators of which are hereby incorporated by reference.

Actuators of the present disclosure may be operatively connected to display 1430 included as part of handle 1400. For example, actuator 1300 may be operatively connected to display 1430 configured to show the current height of implant 1100. Display 1430 may be calibrated such that it correlates each deployed state of actuator 1300 to the height of implant 1100 in the corresponding deployed state. Display 1430 may be analog (e.g., letters and/or numbers identifying the volume in a printed form may be associated with actuator 1300 such that the current state of actuator 1300 is visible on the actuator itself). For example, actuator 1300 may be a rotating disk, where the dimensions (e.g., length, width, height, and/or volume) of implant 1100 at a specific state of actuator 1300 is written on the rotating disk. Alternatively, display 1430 may be digital. For example, actuator 1300 may send an electrical signal to display 1430 based on its current state, and the signal is converted to the corresponding state of implant 1100. Display 1430 then shows the corresponding dimensions (e.g., length, width, height, and/or volume) for the state of implant 1100.

By including display 1430, an operator may be able to easily determine the total volume of a space created in vertebral body 200 by implant 1100. A volume of a bone fortifying material (e.g., a bone cement) may then be injected into the space in vertebral body 200 via inlet port 1410. This volume may be precisely measured to fill the volume of implant 1100 in a deployed state that restores the height of the damaged vertebra (e.g., at most 20% larger or smaller than the volume of the vertebral space, at most 15% larger or smaller than volume of the vertebral space, at most 10% larger or smaller than the volume of the vertebral space, at most 5% larger or smaller than volume of the vertebral space, at most 4% larger or smaller than the volume of the vertebral space, at most 3% larger or smaller than the volume of the vertebral space, at most at most 2% larger or smaller than the volume of vertebral body 200, or at most 1% larger or smaller than the volume of vertebral body 200). The volume of bone fortifying material injected into implant 1100 may be from greater than about 0 mL to about 25 mL (e.g., from about 0.5 ml to about 8 mL, from about 1 mL to about 5 mL, from about 2 mL to about 6 mL, from about 2 mL to about 3 mL, from about 2 mL to about 4 mL, from about 4 mL to about 8 mL, from about 5 mL to about 10 mL, from about 5 mL to about 7 mL, from about 5 mL to about 25 mL, from about 10 mL to about 25 mL, e.g., about 0.1 mL, about 0.5 mL, about 1 mL, about 2 mL, about 3 mL, about 4 mL, about 5 mL, about 6 mL, about 7 mL, about 8 mL, about 9 mL, about 10 mL, about 11 mL, about 12 mL, about 13 mL, about 14 mL, about 15 mL, about 16 mL, about 17 mL, about 18 mL, about 19 mL, about 20 mL, about 21 mL, about 22 mL, about 23 mL, about 24 mL, or about 25 mL, e.g., at most about 7 mL or at most about 10 mL, e.g., about 7 mL or less or about 10 mL or less). The patient's anatomy and physiology, along with the type and extent of damage to the vertebra, may impact the deployed state of implant 1100 chosen for restoring the height of the damaged vertebra and/or the volume of bone fortifying material injected into implant 1100. Pre-injection measurement of the bone fortifying material reduces bone fortifying material leakage and any risks associated therewith.

Bone Fortifying Material

A device of the present disclosure can be configured to inject a bone fortifying material to fill a space created in vertebral body 200 of a subject (e.g., a human). Bone fortifying materials are any chemical or biological composition which may be clinically acceptable and capable of filling the space in vertebral body 200, setting within vertebral body 200, and supporting the vertebra after treatment. Bone fortifying materials may be injected as a solid phase, semi-solid phase, or a liquid phase. Liquid and semi-solid phase bone fortifying materials solidify (or harden) over time, allowing them to support the vertebra. A bone fortifying material may be provided to a practitioner as a single material, or as a first component material and a second component material which are combined prior to injection. The first component material and the second component material may be complementary. For example, the first component material may include a polymer, and the second component material may include the unpolymerized monomer of the polymer. The first component material or the second component material may include one or additional components which impact the rate at which the bone fortifying material sets. For example, either material may include a stabilizer (i.e., a material which slows or inhibits setting of the bone fortifying material), an initiator (i.e., a material which promotes or increases the rate of setting of the bone fortifying material). Once combined, the mixture is injected into the volume of implant 1100 within the vertebral space, where it self-sets to fill the space. The set material is elastic enough to withstand stress or strain acted on vertebral body 200 without breaking.

One of the most common bone fortifying materials used in the art is polymethylmethacrylate (PMMA). PMMA is a two-component bone cement. A first component includes pre-polymerized polymethylmethacrylate (PMMA) and the second component includes methylmethacrylate (MMA). Once combined, the mixtures react forming larger PMMA polymers over time. At the time of combination, bone cement is relatively non-viscous and can be injected into the volume of implant 1100 within the vertebral space. Over time, the bone cement increases in viscosity, eventually setting, at which point the material properties are suitable for supporting the vertebra. Further materials may be added to bone cement to change the properties of the pre-set material or the set material. For example, either the pre-polymerized PMMA or the MMA may be co-polymerized with a different polymeric material to impart different properties on the set material.

Other examples of bone fortifying materials include calcium phosphate, a flowable xenograft bone void filler, calcium sulfate, metal alloys, a polysaccharide, a nucleic acid, a carbohydrate, a protein, a polypeptide, a poly($\alpha$-hydroxy acid), a poly(lactone), a poly(amino acid), a poly (anhydride), a poly(orthoester), a poly(anhydride-co-imide), a poly(orthocarbonate), a poly($\alpha$-hydroxy alkanoate), a poly (dioxanone), a poly(phosphoester), poly(L-lactide) (PLLA), poly(D,L-lactide) (PDLLA), polyglycolide (PGA), poly(lactide-co-glycolide) (PLGA), poly(L-lactide-co-D, L-lactide), poly(D,L-lactide-co-trimethylene carbonate), polyhydroxybutyrate (PHB), poly($\epsilon$-caprolactone), poly($\delta$-valerolactone), poly($\gamma$-butyrolactone), poly(caprolactone), polyacrylic acid, polycarboxylic acid, poly(allylamine hydrochloride), poly(diallyldimethylammonium chloride), poly(ethyleneimine), polypropylene fumarate, polyvinyl alcohol, polyvinylpyrrolidone, polyethylene, carbon fibers, poly(ethylene glycol), poly(ethylene oxide), poly(vinyl alcohol), poly(vinylpyrrolidone), poly(ethyloxazoline), poly (ethylene oxide)-co-poly(propylene oxide), a block copolymer, poly(ethylene terephthalate) polyamide, a homo-polymer or a co-polymer comprising one or more monomers selected from the group consisting of acrolein potassium, (meth)acrylamide, (meth)acrylic acid and salts thereof, (meth)acrylate, acrylonitrile, ethylene, ethylene glycol, ethyleneimine, ethyleneoxide, styrene sulfonate, vinyl acetate, vinyl alcohol, vinyl chloride, and vinylpyrrolidone.

Other bone fortifying materials are known in the art (see, e.g., International Patent Publication Nos.: WO 1995/013835; WO 2006/082442; WO 2008/023254; and WO 2018/006618; U.S. Pat. Nos. 9,433,704; 9,764,057; 11,395,862; and U.S. patent application Ser. Nos. 10/405,359; 11/653,217; 14/110,213; 15/324,590; the bone fortifying materials and bone cements of which are incorporated herein by reference).

Radiopaque Markers

A component of the device of the present disclosure can include at least one radiopaque marker. For example, implant 1100 may include a radiopaque marker. The radiopaque marker may be included along the entire length of implant 1100 or only a portion thereof. For example, the radiopaque markers may be included at proximal end 1110, distal end 1120, or both. Radiopaque markers that can be used in the device are known in the art (see, e.g., U.S. Pat. Nos. 8,900,304; 8,167,884; 10,888,361; 9,510,885; and 11,233,511; the radiopaque materials of which are incorporated herein by reference).

Methods of Use

Devices of the present disclosure may be used during a kyphoplasty procedure to restore height and strength of a damaged vertebra in a subject. In particular, implant 1100 can be used in a method of treating a damaged vertebra by creating a space within a vertebral body of a damaged, compromised, or collapsed vertebra. The method includes inserting implant 1100 into the vertebral body and manipulating implant 1100, for example, by activating actuator 1300, which transmits mechanical force from handle 1400 to implant 1100 via shaft 1200, thereby transitioning implant 1100 from a first state to a second state. Activation of actuator 1300 results in manipulation (e.g., reversible manipulation) of implant 1100 by moving proximal end 1110 of implant 1100 towards or away from distal end 1120 of implant 1100, where distal end 1120 is fixed in its location in the vertebra. Alternatively, distal end 1120 of implant 1100 may be moved towards or away from distal end 1120 of implant 1100, where proximal end 1110 is fixed in its location in the vertebra. Body 1130 of implant 1100 may be made of a malleable material that allows for reversible manipulation without affecting the structural integrity of implant 1100. In moving proximal end 1110 of implant 1100 towards distal end 1120, implant 1100 increases in height, thereby increasing the volume and the height of the vertebra. Conversely, moving proximal end 1110 of implant 1100 away from distal end 1120 decreases the height of implant 1100. Transition of implant 1100 from a first state (e.g., an initial or elongated state) to a second state (e.g., a deployed or heightened state) is shown in FIGS. 4A-4B. Once the vertebral space has been expanded, a volume of a bone fortifying material (e.g., a bone cement) may be added via lumen 1230 of shaft 1200 to fill implant 1100. Implant 1100 may include rod 1150 having lumen 1151 and plurality of openings (e.g., holes, slits, grooves, or access channels) to allow the flow of bone fortifying material into implant 1100. Setting of the bone fortifying material within implant 1100 provides structural support to the vertebra, thereby treating the vertebra (e.g., relieving pain or other discomfort). After the bone fortifying material is set, implant 1100 may be separated from the shaft and handheld component by operation of release mechanism 1420.

Figure 3:
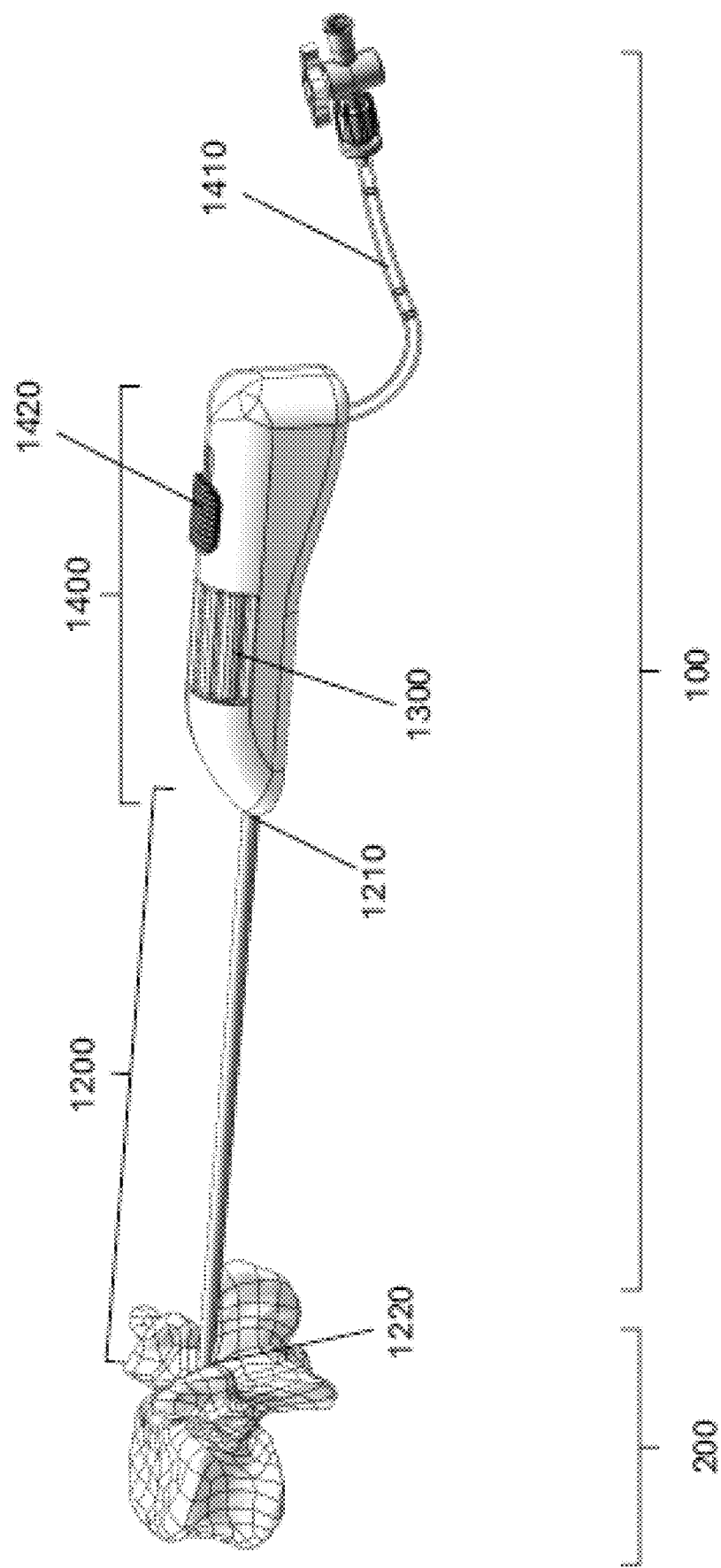
FIG. 3 is an image showing the device of FIG. 1 interacting with vertebral body 200. Implant 1100 is within vertebral body 200.

The vertebral space may be created by drilling a hole in vertebral body 200 with a drill. Methods of creating vertebral spaces in vertebral bodies are known in the art (see, e.g., US 2011/0264098 and U.S. Pat. Nos. 8,579,903; 8,840,621; and 11,213,303; incorporated herein by reference). Access trocar 1160, or other known outer cannulas, may be used as a guide for insertion of shaft 1200 to deliver implant 1100 into the vertebral space of vertebral body 200. The vertebral space is at least large enough to fit implant 1100 in a first state (e.g., an initial state). Implant 1100, attached to shaft 1200, may then be inserted into the vertebral space through the access hole (see, e.g., FIGS. 3 and 4A). An x-ray based imaging technique (e.g., fluoroscopy) may be used to visualize implant 1100 in vertebral body 200 of the subject. One or more radiopaque marker(s) may be present in or on implant 1100 which can facilitate visualization. Shaft 1200 may be used to reposition implant 1100 in vertebral body 200 to a desired position. Force may be applied to shaft 1200 via handle 1400.

The size of implant 1100 may be chosen based on the length of the vertebral body of the patient (e.g., the anterior to posterior (AP) length, e.g., the AP dimension). For example, implant 1100 having a length of 2 cm in an initial state may be selected for a patient that has an AP dimension of about 2 cm.

Once implant 1100 is in the desired position, actuator 1300 may be operated to heighten implant 1100 (FIG. 4B). Actuator 1300 includes a first state, which may correspond to an initial state, and a plurality of deployed states. Each state of actuator 1300 corresponds to a state of implant 1100. For example, the first state of actuator 1300 may correspond to the initial state of implant 1100. Each deployed state of actuator 1300 corresponds to a deployed state of implant 1100 that increases the height of implant 1100 compared to the initial state. Operation of actuator 1300 allows implant 1100 to smoothly transition between any two states. For example, actuator 1300 may be manually operated by rotating a dial to transition between the two states (see, e.g., FIG. 4A and FIG. 4B). Manipulation of implant 1100 to a shortened state (e.g., reversing the manipulation from a deployed state toward the initial state or to an intermediate state) results in a decrease in the height of implant 1100 which may be accompanied by a decrease of the width and increase in the length of implant 1100. Conversely, manipulation of implant 1100 to a heightened state results in an increase in the height of implant 1100 which may be accompanied by an increase of the width and/or a decrease in the length of implant 1100. Accordingly, the volume of implant 1100 may remain constant between each state, including each deployed state and the initial state.

Implant 1100 may include a screw bolt and nut connection at proximal end 1110 to facilitate the transition between the two states. For example, actuator 1300 may be a rotating mechanism (e.g., a dial or a knob) that translates the rotational force onto the nut, thereby rotating the nut to move proximal end 1110, e.g., toward distal end 1120 to increase the height of implant 1100. Consequently, the opposite direction of rotation imparted by the rotating mechanism onto the nut moves proximal end 1110 away from distal end 1120, decreasing the height of implant 1100. In another example, implant 1100 may include rod 1150 that extends between proximal end 1110 and distal end 1120. Actuator 1300 may transmit mechanical force from handle 1400 to rod 1150 via shaft 1200 to retract rod 1150, such that distal end 1120 moves toward proximal end 1110 to increase the height of implant 1100. Implant 1100 may alternatively include a sliding unit in contact with proximal end 1110, for example, on rod 1150 that is extended beyond proximal end 1110, in which proximal end 1110 may be moved toward distal end 1120 by transmitting mechanical force onto the sliding unit.

As implant 1100 heightens, it pushes on the vertebra, thereby expanding the vertebral space. Implant 1100 may also conform to the architecture of the vertebral space as it heightens. As the vertebral space expands, the height and/or angle of the damaged vertebra may be restored. For example, expanding the vertebral space may increase the height of a damaged vertebra to its former height or to the height of an undamaged vertebra, or may alter the angle of a damaged vertebra relative to the neighboring vertebra to the angle of an undamaged vertebra. Accordingly, the state of implant 1100 for restoring a damaged vertebrae may vary depending upon the extent of damage of the vertebrae and the amount of space needed to treat damage to the vertebrae and to restore the patient's anatomy. The operator may determine the state of implant 1100 based on tactile feedback, such as resistance felt during the transition between two states, so as to avoid overexerting force onto the vertebra as implant 1100 heightens. Such force may cause further damage to the damaged vertebra. The position and state of implant 1100 in the vertebral body may also be imaged during deployment by way of the radiopaque marker(s) and an imaging technique (e.g., fluoroscopy), providing an additional or alternative means of determining the appropriate deployed state for treating the damaged vertebra.

After deployment of implant 1100, a bone fortifying material can be injected into implant 1100 via lumen 1230 of shaft 1200. Lumen 1230 is in fluid communication with the internal volume of implant 1100 via lumen 1111 in proximal end 1110, allowing the bone fortifying material to flow via lumen 1230 to fill the volume of implant 1100. When implant 1100 includes rod 1150, the bone fortifying material may flow over rod 1150 to fill the volume of implant 1100. Rod 1150 may also include lumen 1151 and a plurality of openings (e.g., holes, slits, grooves, or access channels) that allow flow of the bone fortifying material into implant 1100. Lumen 1151 may be fluidically to lumen 1230 of shaft 1200 to allow the flow of bone fortifying material out of the plurality of openings and into implant 1100, providing a more uniform distribution of bone fortifying material within and, optionally, outside of implant 1100. The volume of bone fortifying material to be injected into implant 1100 may be determined based on the size (e.g., height, width, and/or length) and shape of implant 1100.

An indicator (e.g., a display) of actuator 1300 may include indicia corresponding to the state used initially to configure implant 1100 to a desired height (e.g., height, width, and length of implant 1100). The display may indicate or may be used to determine the volume of a bone fortifying material that is needed to fill implant 1100. An operator may refer to the display coupled to actuator 1300 in order to select the bone fortifying material volume to be delivered to implant 1100 or, alternatively, an operator may deliver more or less volume of a bone fortifying material than the volume identified on the display of actuator 1300, as desired. The volume of implant 1100 may be provided or known based on the dimensions of implant 1100. Implant 1100 may be configured such that the bone fortifying material does not leak out of implant 1100 and to tissue surrounding vertebral body 200. Alternatively, flexible membrane 1140 may be configured such that implant 1100 allows some leakage of the bone fortifying material in superior and/or inferior sides of the vertebral space to, e.g., penetrate fracture lines, but substantially reduces or inhibits leakage in posterior and/or anterior sides of the vertebral space. The volume of bone fortifying material added to implant 1100 may exceed the volume of implant 1100 in order to cause leakage of bone fortifying material out of implant 1100 and in superior and inferior sides of the vertebral space. The bone fortifying material may be delivered using an injection pressure. The injection pressure for a bone fortifying material in the present disclosure may be reduced relative to the injection pressure used in the art to deliver the bone fortifying material. For example, the injection pressure may be from, e.g., about 1000 kPa to about 3000 kPa (e.g., about 1000 kPa to about 1500 kPa, about 1250 kPa to about 1750 kPa, about 1500 kPa to about 2000 kPa, about 2000 kPa to about 3000 kPa, e.g., about 1000 kPa, about 1250 kPa, about 1500 kPa, about 1750 kPa, about 2000 kPa, about 2250 kPa, about 2500 kPa, about 2750 kPa, or about 3000 kPa). The injection pressure of the bone fortifying material may be at least 1500 kPa.

Figure 4C:
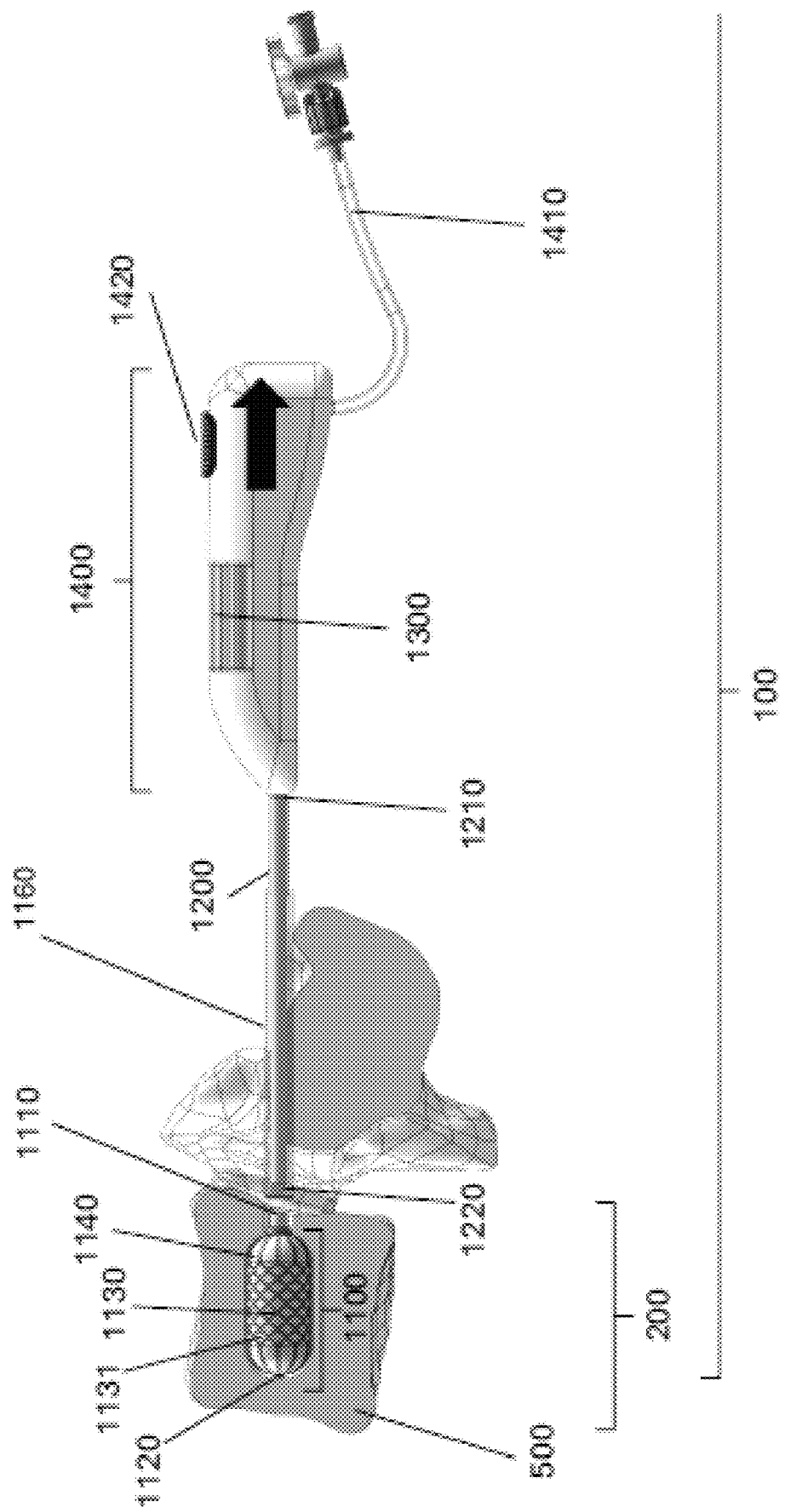
Figure 4D:
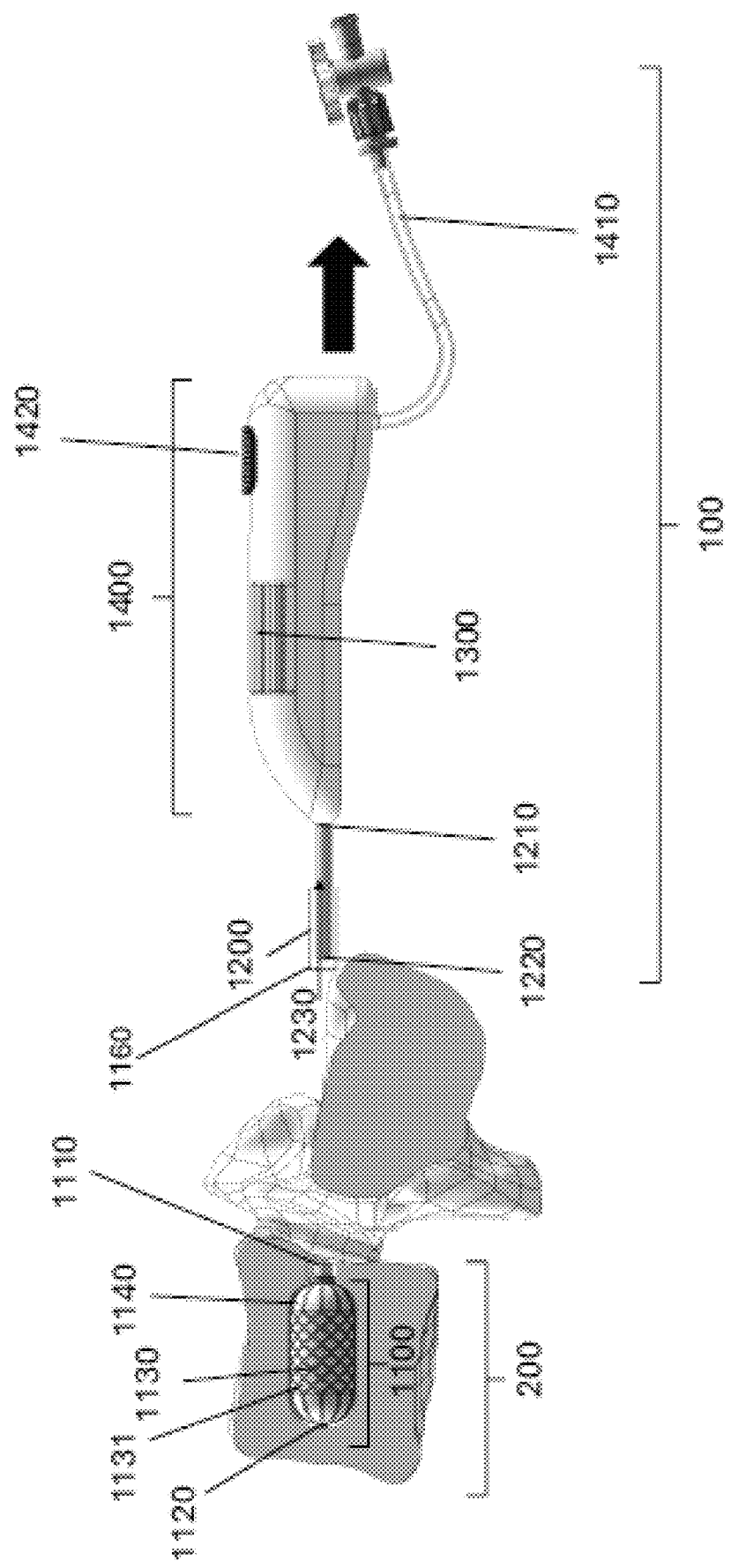

After injection of the bone fortifying material, the bone fortifying material begins to set. Once set, implant 1100 is detached from shaft 1200 (see FIGS. 4C-4D), and the state of implant 1100 is maintained. Implant 1100 and shaft 1200 may be detached via release mechanism 1420, for example by transitioning release mechanism 1420 to the detached state. The attachment between implant 1100 and shaft 1200 may be reversible before injection of the bone fortifying material. For example, after being detached, proximal end 1110 of implant 1100 and distal end 1220 of shaft 1200 may be aligned such that release mechanism 1420 may be moved to the attached state, thereby reattaching implant 1100 and shaft 1200. Further to this example, implant 1100 and shaft 1200 may be reattached by reestablishing a screw connection by way of, e.g., a threaded insert and a complementary screw. Actuator 1300 may be operated to change the state of implant 1100 to heighten or flatten implant 1100. An operator may decide to reposition and/or change the state of implant 1100 after visualization of the position of the implant in the vertebral body by way of the radiopaque marker and an imaging technique (e.g., fluoroscopy).

Kits

Also featured are kits containing a device of the disclosure, including implant 1100, shaft 1200, actuator 1300, and one or more additional components. The one or more components may include one or more of release mechanism 1420, display 1430, and handle 1400 (to which actuator 1300, release mechanism 1420, and display 1430 are attached). The components may be supplied in the kit in a disassembled form or the device may be fully assembled in the kit.

The kit may also include one or more of a coaxial bone access system (e.g., an access coaxial trocar system), a delivery wire, a bone fortifying material (e.g., bone cement), a bone fortifying material injection device, and a bone drill. Exemplary bone drills are known in the art (see, e.g., US 2018/0064471 and U.S. Pat. Nos. 7,615,079; 8,109,979; 8,579,903; 8,840,621; and 10,245,154; incorporated herein by reference). The bone fortifying material (e.g., bone cement) may be provided as a first component material and a second component material which are combined prior to administration. The kit and its components can be used in a kyphoplasty procedure, during which a vertebral space is created in vertebral body 200 (e.g., using the bone drill). Implant 1100 is inserted into the vertebral space and heightened (e.g., using actuator 1300) to enlarge the vertebral space in vertebral body 200, and the bone cement is inserted into implant 1100 (e.g., through shaft 1200) to fill the volume of implant 1100. Release mechanism 1420 may then be used to detach implant 1100 from shaft 1200.

A kit may include a package insert containing instructions related to the operation of the device. For example, the package insert may describe a method for performing a kyphoplasty using the device of the present disclosure.

EXAMPLES

The following examples were meant to illustrate the invention. They were not meant to limit the invention in any way.

Example 1: Use of a Kyphoplasty Device

Figure 1:
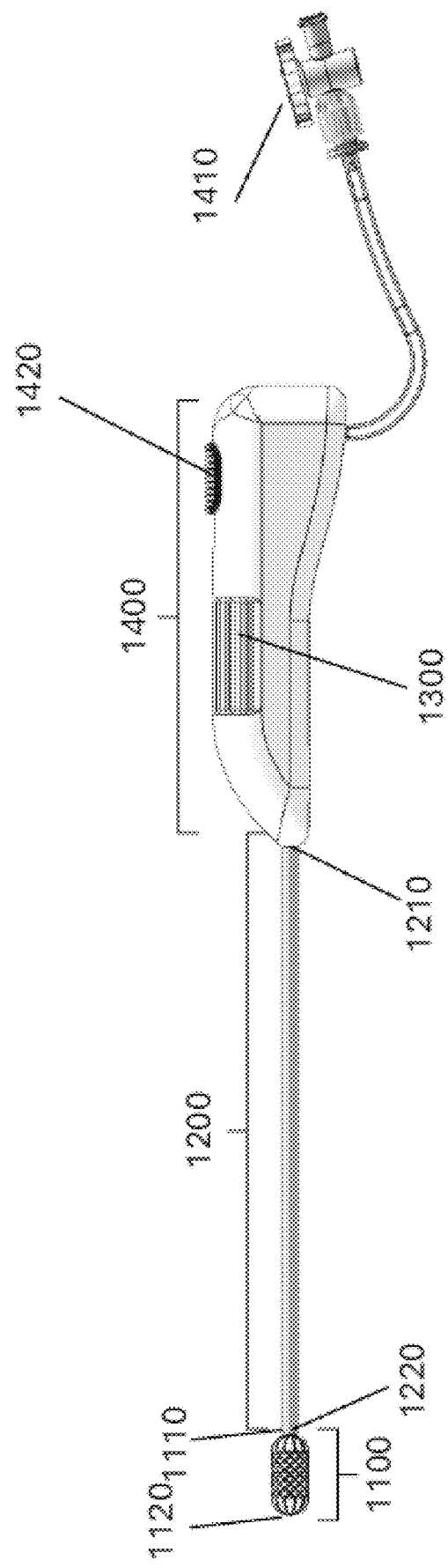
FIG. 1 is an image showing device 100 including implant 1100, elongate member (shaft) 1200, and handle 1400. Implant 1100 includes proximal end 1110 and distal end 1120. Shaft 1200 includes proximal end 1210 and distal end 1220. Handle 1400 includes actuator 1300, inlet port 1410, and release mechanism 1420. Proximal end 1110 of implant 1100 is reversibly attached to distal end 1220 of shaft 1200.

This example demonstrates use of a device of the disclosure (see, e.g., FIG. 1) that includes implant 1100, shaft 1200, and actuator 1300 in the treatment of a damaged vertebra (e.g., a vertebral compression fracture).

A subject is determined to be in need of a kyphoplasty procedure, for example, via magnetic resonance imaging (MRI). A coaxial trocar system is used to gain access into the target vertebral body through pedicular or parapedicular access. Methods and systems used to gain access to a target vertebral body are well known in the art. A bone drill is then used to create a vertebral space in the damaged vertebra. Implant 1100, attached at proximal end 1110 to distal end 1220 of shaft 1200, is then navigated into the vertebral space through access trocar 1160. Force may be applied to shaft 1200 via handle 1400 in order to correctly position implant 1100. An imaging technique (e.g., X-ray imaging) may be used to observe implant 1100 (e.g., having a radiopaque marker) and ensure its appropriate positioning within vertebral body 200. Access trocar 1160 is removed, and actuator 1300, optionally located on handle 1400, is then operated to transition implant 1100 from a first state to a second, heightened state, thereby expanding the vertebral space to a desired volume and height. Activation of actuator 1300 results in reversible radial contraction or extension of implant 1100 by moving proximal end 1110 of implant 1100 towards or away from distal end 1120 of implant 1100, respectively. Actuator 1300 may be operatively connected to a display configured to show the current dimensions (e.g., height, length, width, and/or volume) of implant 1100 based on the deployed state of actuator 1300.

The current volume of implant 1100 may be used to determine a volume of a bone fortifying material to be injected into the volume of implant 1100. The determined volume is injected into implant 1100 via lumen 1230 of shaft 1200 in fluid communication with lumen 1111 at proximal end 1110. Implant 1100 may include rod 1150 having lumen 1151 in fluid communication with lumen 1230 of shaft 1200. Rod 1150 may include a plurality of openings (e.g., holes, slits, grooves, or access channels) to allow the flow of bone fortifying material into implant 1100. The determined volume may optionally be provided via inlet port 1410 of handle 1400, when present. Flexible membrane 1140 of implant 1100 may be configured such that it allows some leakage of the bone fortifying material to superior and/or inferior aspects (or sides) of the vertebral space but substantially inhibits leakage of the bone fortifying material to anterior and/or posterior aspects (or sides) of the vertebral space outside of implant 1100 (see, e.g., FIG. 5). This may allow the penetration of bone fortifying material into the fracture lines of the damaged vertebra while also inhibiting the flow of bone fortifying material toward the vessels. Once injected, the bone fortifying material begins to set. Once set, implant 1100 and shaft 1200 are separated, for example by operating release mechanism 1420 attached to handle 1400.

Treatment of a subject using this method may reduce back pain in a subject with minimal complications.

OTHER EMBODIMENTS

Various modifications and variations of the described invention will be apparent to those skilled in the art without departing from the scope and spirit of the invention. Although the invention has been described in connection with specific embodiments, it should be understood that the invention as claimed should not be unduly limited to such specific embodiments. Indeed, various modifications of the described modes for carrying out the invention that are obvious to those skilled in the art are intended to be within the scope of the invention.

The complete disclosures of all patents, patent applications including provisional patent applications, publications including patent publications and non-patent publications, and electronically available material cited herein are incorporated by reference.

Other embodiments are in the claims.

The invention claimed is:

1. A device for performing a kyphoplasty procedure comprising:
    (a) an implant that is sized for placement in a vertebral space within a vertebra of a subject, wherein the implant comprises a proximal end, a distal end, a body comprising a plurality of struts extending between the proximal end and the distal end, and a flexible membrane in contact with the plurality of struts, and a rod extending from the proximal end to the distal end of the implant; wherein the implant is configured to transition from a first state comprising a first height, a first width, and a first length, to a second state comprising a second height, a second width, and a second length; and wherein the implant is malleable;
    (b) a shaft comprising a proximal end, a distal end, and a lumen between the proximal and distal ends, wherein the distal end of the shaft is reversibly coupled to the proximal end of the implant;
    (c) an actuator coupled to the implant via the shaft, wherein the actuator is configured to transition the implant from the first state to the second state upon activation; and
    (d) an indicator for identifying a property of the implant in the second state.

2. The device of claim 1, wherein the property is a height or a volume.

3. The device of claim 1, wherein the indicator comprises a display.

4. The device of claim 1, wherein the actuator is configured to transition the implant from the first state to the second state by transmitting mechanical force to the proximal end of the implant to move the proximal end of the implant toward the distal end of implant.

5. The device of claim 1, wherein:
    (i) the lumen of the shaft and a lumen of the rod are in fluid communication; and/or
    (ii) the rod comprises a plurality of openings.

6. The device of claim 5, wherein the device further comprises an inlet port that is fluidly connected to the lumen of the shaft, whereby the inlet port is configured to receive a volume of a solid phase, a semi-solid phase, or a liquid phase bone fortifying material for delivery to the implant.

7. The device of claim 6, wherein the device further comprises a handle, wherein the proximal end of the shaft is in contact with the handle, wherein the handle comprises the inlet port, and optionally wherein the actuator is located on the handle.

8. The device of claim 1, wherein the flexible membrane comprises a continuous flexible material that partially covers the body of the implant on an interior or exterior of the plurality of struts, wherein the flexible membrane is configured to allow fluidic output at a superior side and/or an inferior side of the vertebral space while inhibiting or reducing fluidic output at an anterior side and/or posterior side of the vertebral space.

9. The device of claim 1, wherein the flexible membrane comprises a continuous flexible material that fully covers the body of the implant on an interior or exterior of the plurality of struts, wherein the flexible membrane is configured to fluidically seal the implant.

10. The device of claim 1, wherein the flexible membrane comprises a biocompatible material, optionally wherein the flexible membrane comprises polytetrafluoroethylene, polyester fiber, or Dacron.

11. The device of claim 1, wherein the plurality of struts:
    (i) form a plurality of lattice cells, wherein the plurality of lattice cells have a polygonal, square, rectangular, triangular, diamond, circular, elliptical, oval, oblong, lens, asteroid, deltoid, slit, or amorphous shape; or
    (ii) converge at both the proximal end and the distal end of the implant and are spaced apart therebetween, and wherein each of the plurality of struts has one or more curve.

12. The device of claim 1, wherein the plurality of struts are deformable and comprise nitinol, stainless steel, or platinum.

13. The device of claim 1, wherein the implant is shaped as a sphere, ovoid, dimpled ovoid, or cylinder in the first state and/or the second state.

14. The device of claim 1, wherein the implant in the first state has:
    (i) a length of from about 1 cm to about 10 cm;
    (ii) a width of from about 0.5 cm to about 5 cm; and
    (iii) a height of from about 0.2 cm to about 1 cm; and
wherein the implant in the second state has:
    (iv) a length of from about 0.5 cm to about 5 cm;
    (v) a width of from about 1 cm to about 10 cm; and
    (vi) a height of from about 0.3 cm to about 5 cm.

15. The device of claim 1, wherein the implant further comprises a radiopaque marker.

16. The device of claim 1, wherein the device further comprises:
    (i) a loop, a fastener, a hook, a screw connection, or a magnet that attaches the shaft to the implant; and/or
    (ii) a release mechanism operatively coupled to the shaft, whereby operation of the release mechanism is configured to detach the shaft from the implant, optionally wherein the release mechanism is configured as a lever, a rotating disk, a push-button, a screw connection, or a slide block.

17. A method of performing a kyphoplasty procedure, the method comprising:
   (a) inserting the implant of the device of claim 1 into a vertebral space of a vertebra of a subject;
   (b) transitioning the implant from the first state to the second state by activating actuator, wherein the actuator transmits a mechanical force to the proximal end of the implant via the shaft to move the proximal end of the implant toward the distal end of implant, wherein the indicator of the device indicates a value for the second height and an implant volume;
   (c) injecting a volume of a bone fortifying material based on the value of the indicator; and
   (d) detaching the shaft of the device from the implant.

18. The method of claim 17, wherein activating the actuator in step (b) increases the height of the implant.

19. The method of claim 17, wherein the vertebra is a damaged, collapsed, or compromised vertebra, optionally wherein the damaged vertebra comprises a vertebral compression fracture, and optionally wherein the damaged vertebra has a reduced height relative to an undamaged vertebra.

20. The method of claim 17, wherein, prior to step (a), the method further comprises creating the vertebral space in the vertebra with a bone drill.

21. The method of claim 17, wherein the method comprises increasing the volume and/or the height of the vertebra.

22. The method of claim 17, wherein the method further comprises, before step (c), reattaching the implant and the shaft, and, optionally, repositioning the implant in the vertebral space.

23. The method of claim 22, wherein the implant comprises a radiopaque marker, and repositioning the implant further comprises using an imaging technique to visualize the position of the implant in the vertebral body by way of the radiopaque marker, optionally wherein the imaging technique is x-ray based imaging.

24. The method of claim 17, wherein the bone fortifying material is provided as a first component material and a second component material, and the method further comprises mixing the first component material and the second component material prior to step (c).

25. The method of claim 17, wherein the volume of the bone fortifying material is 10 mL or less, and wherein the bone fortifying material is configured to harden.

26. The method of claim 17, wherein, after step (c), the bone fortifying material is confined within the implant and does not leak into the vertebral space.

27. The method of claim 17, wherein the flexible membrane is configured to permit leakage of the bone fortifying material through a superior side and/or an inferior side of the vertebral space while inhibiting or reducing leakage of the bone fortifying material into an anterior side and/or a posterior side of the vertebral space.

28. The method of claim 17, wherein the actuator is attached to a handle of the device, wherein the handle further comprises an inlet port in fluid communication with a lumen of the shaft of the device, and wherein the bone fortifying material is injected into the implant through the inlet port and via the shaft.

29. The method of claim 17, wherein the handle further comprises a release mechanism configured to detach the shaft from the implant, wherein step (d) further comprises activating the release mechanism, thereby detaching the shaft from the implant.

30. A kit comprising:
   (i) the device of claim 1; and optionally,
   (i) a bone fortifying material;
   (ii) a handle, wherein the actuator and the display are located on the handle;
   (iv) a release mechanism attached to the handle;
   (v) a coaxial bone access system; and
   (vi) a bone drill.

* * * * *